(12) United States Patent
Lloyd et al.

(10) Patent No.: US 6,779,178 B1
(45) Date of Patent: Aug. 17, 2004

(54) SYSTEM AND METHOD FOR PERSONALIZING ELECTRONIC MAIL MESSAGES

(75) Inventors: Michael Lloyd, Old Lyme, CT (US); Christopher Shepley, Washington, DC (US); Sean Stidman, Arlington, VA (US); H. Lee Browne, Greenwich, CT (US); Curtis Generous, Great Falls, VA (US); John Lycas, Herndon, VA (US)

(73) Assignee: Signature Mail. Com, LLC, Greenwich, CT (US)

( * ) Notice: Subject to any disclaimer, the term of this patent is extended or adjusted under 35 U.S.C. 154(b) by 0 days.

(21) Appl. No.: 09/397,641

(22) Filed: Sep. 16, 1999

Related U.S. Application Data

(63) Continuation-in-part of application No. 09/244,969, filed on Feb. 10, 1999, now abandoned, which is a continuation-in-part of application No. 09/198,346, filed on Nov. 24, 1998, now abandoned, which is a continuation-in-part of application No. 08/992,253, filed on Dec. 17, 1997, now abandoned, which is a continuation-in-part of application No. 08/934,661, filed on Sep. 29, 1997, now abandoned, which is a continuation-in-part of application No. 08/842,013, filed on Apr. 23, 1997, now abandoned, which is a continuation-in-part of application No. 08/821,643, filed on Mar. 20, 1997, now abandoned, which is a continuation-in-part of application No. 08/813,121, filed on Mar. 7, 1997, now abandoned.

(60) Provisional application No. 60/128,045, filed on Apr. 7, 1999, provisional application No. 60/121,002, filed on Feb. 19, 1999, and provisional application No. 60/091,913, filed on Jul. 7, 1998.

(51) Int. Cl.[7] .......................... G06F 17/30; G06F 15/16
(52) U.S. Cl. .......................... 717/174; 707/10; 709/206
(58) Field of Search .......................... 707/10, 541, 500, 707/505, 513, 9, 104.1, 507; 358/402; 379/93.24, 100.08; 713/176, 170; 345/335; 705/76; 382/217, 229; 709/203, 206; 717/178; 715/513

(56) References Cited

U.S. PATENT DOCUMENTS

| | | | |
|---|---|---|---|
| 4,631,355 A | 12/1986 | Federico et al. | 178/18 |
| 4,833,312 A | 5/1989 | Minematsu et al. | 235/379 |
| 4,839,634 A | 6/1989 | More et al. | 340/712 |
| 5,150,420 A | 9/1992 | Haraguchi | 382/3 |
| 5,157,737 A | 10/1992 | Sklarew | 382/13 |

(List continued on next page.)

OTHER PUBLICATIONS

Daniel Crawford, Release Announcement for "An RFD Mail ToolSet for GMU Users", Jul. 25, 1994 obtained via the Internet at <http://groups.google.com>.*

(List continued on next page.)

*Primary Examiner*—Greta Robinson
(74) *Attorney, Agent, or Firm*—Min, Hsieh & Hack, LLP

(57) ABSTRACT

Methods, systems, and articles of manufacture consistent with the present invention provide an e-mail customization system that incorporates personalized images, including handwritten signatures, into existing e-mail messages. Specifically, the e-mail customization system generates customized software that integrates with existing e-mail systems that provides the ability to select different hand-written signatures. Once a signature is selected, the signature may be included in all e-mail sent from the user. A recipient capable of displaying HTML e-mail messages, views the e-mail message with the signature. This signature provides a readily discernable visual queue indicating the sender of the e-mail message. In case the recipient's e-mail system does not recognize HTML formatted messages, a clean copy of the e-mail message and an alternate text version of the image is added to the top of the HTML message. In addition, methods, systems, and articles of manufacture consistent with the present invention include handwritten signatures into web-based e-mail systems and electronic greeting cards.

6 Claims, 37 Drawing Sheets

U.S. PATENT DOCUMENTS

| | | | | |
|---|---|---|---|---|
| 5,194,852 A | | 3/1993 | More et al. | 340/712 |
| 5,215,397 A | | 6/1993 | Taguchi et al. | 401/194 |
| RE34,476 E | | 12/1993 | Norwood | 382/13 |
| 5,274,474 A | | 12/1993 | Medina | 358/462 |
| 5,285,506 A | | 2/1994 | Crooks et al. | 382/13 |
| 5,309,555 A | | 5/1994 | Akins et al. | 395/157 |
| 5,315,504 A | * | 5/1994 | Lemble | 364/400 |
| 5,322,978 A | | 6/1994 | Protheroe et al. | 178/18 |
| 5,380,958 A | | 1/1995 | Protheroe et al. | 178/18 |
| 5,401,916 A | | 3/1995 | Crooks | 178/18 |
| 5,412,161 A | | 5/1995 | Crooks et al. | 178/18 |
| 5,421,779 A | | 6/1995 | Castro | 462/8 |
| 5,436,972 A | | 7/1995 | Fischer | 380/25 |
| 5,448,044 A | | 9/1995 | Price et al. | 235/380 |
| 5,469,536 A | | 11/1995 | Blank | 380/49 |
| 5,475,401 A | | 12/1995 | Verrier et al. | 345/179 |
| 5,477,511 A | | 12/1995 | Englehardt | 369/25 |
| 5,517,578 A | | 5/1996 | Altman et al. | 382/181 |
| 5,524,240 A | | 6/1996 | Barbara et al. | 395/600 |
| 5,534,893 A | | 7/1996 | Hansen, Jr. et al. | 345/179 |
| 5,539,159 A | | 7/1996 | Protheroe et al. | 178/18 |
| 5,544,255 A | | 8/1996 | Smithies et al. | 382/119 |
| 5,548,753 A | * | 8/1996 | Linstead et al. | 707/1 |
| 5,606,609 A | | 2/1997 | Houser et al. | 380/4 |
| 5,627,997 A | | 5/1997 | Pearson et al. | 395/500 |
| 5,647,002 A | | 7/1997 | Brunson | 380/49 |
| 5,659,742 A | | 8/1997 | Beattie et al. | 707/104 |
| 5,675,507 A | | 10/1997 | Bobo | 364/514 |
| 5,694,546 A | * | 12/1997 | Reisman | 705/26 |
| 5,706,434 A | | 1/1998 | Kremen et al. | 345/173 |
| 5,739,512 A | | 4/1998 | Tognazzini | 235/380 |
| 5,742,279 A | | 4/1998 | Yamamoyo et al. | 345/173 |
| 5,742,768 A | | 4/1998 | Gennaro et al. | 295/200.33 |
| 5,751,960 A | | 5/1998 | Matsunaga | 395/200.36 |
| 5,752,059 A | | 5/1998 | Holleran et al. | 395/200.75 |
| 5,754,772 A | | 5/1998 | Leaf | 395/200.33 |
| 5,765,178 A | | 6/1998 | Tanaka | 707/526 |
| 5,778,372 A | | 7/1998 | Cordell et al. | 707/100 |
| 5,781,189 A | | 7/1998 | Holleran et al. | 345/335 |
| 5,781,714 A | | 7/1998 | Collins et al. | 395/171 |
| 5,781,901 A | | 7/1998 | Kuzma | 707/10 |
| 5,790,793 A | | 8/1998 | Higley | 395/200.48 |
| 5,799,285 A | | 8/1998 | Klingman | 705/26 |
| 5,815,663 A | | 9/1998 | Uomini | 395/200.44 |
| 5,818,447 A | * | 10/1998 | Wolf et al. | 345/335 |
| 5,819,040 A | | 10/1998 | Ogaki et al. | 395/200.47 |
| 5,848,426 A | * | 12/1998 | Wang et al. | 707/505 |
| 5,850,219 A | | 12/1998 | Kumomura et al. | 345/331 |
| 5,864,604 A | | 1/1999 | Moen et al. | 379/88 |
| 5,898,836 A | | 4/1999 | Freivald et al. | 709/218 |
| 5,948,103 A | * | 9/1999 | Fukuzaki | 713/200 |
| 6,023,586 A | * | 2/2000 | Gaisford et al. | 717/11 |
| 6,028,938 A | * | 2/2000 | Malkin et al. | 705/75 |
| 6,064,751 A | * | 5/2000 | Smithies et al. | 382/115 |
| 6,067,582 A | * | 5/2000 | Smith et al. | 710/5 |
| 6,085,321 A | * | 7/2000 | Gibbs et al. | 713/170 |
| 6,085,322 A | * | 7/2000 | Romney et al. | 713/176 |
| 6,091,835 A | * | 7/2000 | Smithies et al. | 382/115 |
| 6,167,518 A | * | 12/2000 | Padgett et al. | 713/186 |
| 6,189,009 B1 | * | 2/2001 | Stratigos et al. | 707/10 |

OTHER PUBLICATIONS

Brown et al., Using Netscape 2, pp. 327–375, and 969–973, Jan. 1995.*

David Pogue, The Secrets Software, Third Edition, Chapter 34, pp. 959–960.

Scott Hayes, Using on America Online, First Class Text–Picture, 1955, pp. 1–17 (dated Jul. 17, 1996).

http://www.drlink.com, Dr. Link Database, L. C. Leong, "Sign in and keep out (digital signatures)," Database Doc. No. 946964, Jun. 14, 1993.

http://www.drlink.com, Dr. Link Database, M. A. Moyers, et al., "Using Bitnet on the VAX," Database Doc. No. 179057, Jan. 1, 1991.

http://www.drlink.com, Dr. Link Database, Unknown, "AT&T Co, EO Inc and Go Corp are ready to offer an electronic," Database Doc. No. 42482, Sep. 23, 1993.

http://www.drlink.com, Dr. Link Database, Unknown, "Handwriting Recognition by Computers: Theory and Fundamentals," Database Doc. No. 245907, Mar. 1, 1993.

http://www.drlink.com, Dr. Link Database, Unknown, "Handwriting Recognition by Computers: Theory and Fundamentals," Database Doc. No. 306198, Dec. 1, 1993.

http://www.drlink.com, Dr. Link Database, Unknown, "Handwriting Recognition by Computer," Database Doc. No. 266192, Jun. 1, 1993.

http://www.drlink.com, Dr. Link Database, Unknown, "Handwriting Recognition by Computer," Database Doc. No. 299326, Nov. 1, 1993.

http://www.drlink.com, Dr. Link Database, F. Piper et al., "Digital signatures and hash functions," Database Doc. No. 1288339, Oct. 20, 1993.

http://www.drlink.com, Dr. Link Database, T. S. Wilkinson, et al., "Use of synthetic discriminant functions for hand-written–signature verification" Database Doc. No. 493744, Aug. 10, 1991.

http://www.drlink.com, Dr. Link Database, Unknown, "Newton News—1," Database Doc. No. 44384, dated Aug. 5, 1993.

http://www.drlink.com, Dr. Link Database, Unknown, "Apple Debuts Newton Concept As First CE Move," Database Doc. No. 15360, dated Jun. 1, 1992.

http://www.drlink.com, Dr. Link Database, Unknown, "Microsoft, Apple, Others Do Give A Jot," Database Doc. No. 46779, dated May 27, 1993.

* cited by examiner

(1) FILL OUT INFORMATION

FIRST NAME:   MIDDLE (OPTIONAL):   LAST NAME:

ENTER E-MAIL ADDRESS TWICE TO ENSURE ACCURACY

PERSONAL INFORMATION 702

E-MAIL ADDRESS:   RE-ENTER E-MAIL PASSWORD:

CHOOSE A PRIVATE PASSWORD FOR DOWNLOADING SOFTWARE

ENTER PASSWORD   RE-ENTER PASSWORD:

---

(2) TYPE IN THE TEXT EQUIVALENT OF YOUR SIGNATURE

IN THIS SECTION, YOU MUST TYPE IN A TEXT EQUIVALENT FOR EACH SIGNATURE/ GREETING THAT YOU ORDER. THE TEXT (TYPED) EQUIVALENT WILL SHOW UP IN PLACE OF YOUR SIGNATURE IMAGE WHEN VIEWED BY OLDER E-MAIL PROGRAMS.

YOU MAY ORDER UP TO 5 SIGNATURE/GREETINGS AND THE SOFTWARE CREATED CAN BE USED AS OFTEN AS YOU LIKE WITHIN THE BETA TEST PERIOD. THE NUMBER YOU ORDER IS DETERMINED BY THE NUMER OF TEXT EQUIVALENT BOXES THAT YOU FILL IN BELOW.

TYPE IN A TEXT EQUIVALENT FOR EACH SIGNATURE YOU ORDER:

TEXT EQUIVALENT INFORMATION 704

SIGNATURE 1:
SIGNATURE 2:
SIGNATURE 3:
SIGNATURE 4:
SIGNATURE 5:

CLICK ON BUTTON BELOW TO CONTINUE THE ORDERING PROCESS

TO DOWNLOAD YOUR FREE COPY OF
SIGNATURE-MAIL, YOU MUST:

1. COMPLETE THE INFORMATION ON THIS PAGE
2. CLICK 'GENERATE SOFTWARE' BUTTON BELOW
3. CHECK YOUR E-MAIL

---

(1) TYPE IN THE TEXT EQUIVALENT OF YOUR SIGNATURE IMAGES

IN THIS SECTION, YOU MUST TYPE IN A TEXT EQUIVALENT FOR EACH OF THE IMAGES BELOW OR THE IMAGE WILL NOT BE INCLUDED IN THE SOFTWARE.

TYPE TEXT EQUIVALENT HERE:
734 [                    ]

736 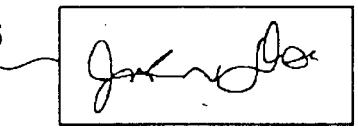

---

(2) FILL OUT SUBSCRIBER INFORMATION

FIRST NAME:    MIDDLE(OPTIONAL):    LAST NAME:
[         ]    [           ]         [         ]

ENTER E-MAIL ADDRESS TWICE TO ENSURE ACCURACY

738

E-MAIL ADDRESS:              RE-ENTER E-MAIL ADDRESS:
[              ]             [                    ]

CHOOSE A PRIVATE PASSWORD FOR DOWNLOADING SOFTWARE

ENTER PASSWORD:              RE-ENTER PASSWORD:
[              ]             [                    ]

---

(3) GENERATE SOFTWARE        YES ○    NO ○

740 [ GENERATE SOFTWARE ]

HAPPY
    BIRTHDAY

*FIG. 19*

SYSTEM AND METHOD FOR PERSONALIZING ELECTRONIC MAIL MESSAGES

RELATED APPLICATIONS

This application is a continuation-in-part of U.S. patent application Ser. No. 09/244,969, filed Feb. 10, 1999, which is a continuation-in-part of U.S. patent application Ser. No. 09/198,346, filed Nov. 24, 1998, which is a continuation-in-part of U.S. patent application Ser. No. 08/992,253, filed Dec. 17, 1997, which is a continuation-in-part of U.S. patent application Ser. No. 08/934,661, filed Sep. 29, 1997, which is a continuation-in-part of U.S. patent application Ser. No. 08/842,013, filed Apr. 23, 1997, which is a continuation-in-part of U.S. patent application Ser. No. 08/821,643, filed Mar. 20, 1997, which is a continuation-in-part of U.S. patent application Ser. No. 08/813,121, filed Mar. 7, 1997, all of which are now abandoned and are incorporated herein by reference.

Provisional U.S. patent application Ser. No. 60/091,913, entitled "System and Method for Displaying Information from an Electronic Mail Message in a Status Bar," filed Jul. 7, 1998, provisional U.S. Patent Application No. 60/121,002, entitled "System and Method for Transporting Handwritten Images," filed Feb. 19, 1999, and provisional U.S. Patent Application No. 60/128,045, entitled "System and Method for Transporting Handwritten Images," filed Apr. 7, 1999, are all relied upon and are incorporated by reference in this application.

BACKGROUND OF THE INVENTION

A. Field of the Invention

This invention relates generally to data processing systems and, more particularly, to a method for personalizing electronic mail messages.

B. Description of the Related Art

Electronic mail (e-mail) has become an increasingly popular and efficient means of communication. Whether involving intraoffice communication or interoffice communication between distant geographic sites, e-mail provides users with an efficient tool for sending messages that far surpasses traditional forms of communication, such as telephone or postal mail.

Some e-mail systems can use formatting languages, such as the well known HyperText Markup Language (HTML), to incorporate information besides text data in an e-mail message. HTML provides the ability to incorporate text and graphics into a document by using "tags." HTML tags are codes that identify an element in a document, such as a heading or a font, for the purpose of formatting information in the HTML document. For example, the tag "<BOLD>" indicates that the text should appear bold. These e-mail systems are known as HTML-compatible e-mail systems. An example of an HTML compatible e-mail system is the Netscape Communicator e-mail system available from Netscape Corporation of MountainView, Calif.

Most HTML-compatible e-mail systems use a mime HTML (MHTML) standard to include HTML formatted information into an e-mail message. The MTHML standard dictates that an e-mail message is sent in both an HTML format and a text format without HTML tags. The receiving e-mail system will only show the HTML version if it is HTML-compatible, otherwise it will show the text version. Although HTML-compatible e-mail systems can incorporate graphics and special formatting to an e-mail message using the MHTML standard, they do not provide the ability to personalize e-mail messages. This limitation often makes messages somewhat impersonal because they lack anything identifiable to the sender.

Thus, since conventional e-mail systems cannot be used to personalize their messages, it is desirable to improve e-mail systems.

SUMMARY OF THE INVENTION

Methods, systems, and articles of manufacture consistent with the present invention provide an e-mail customization system that incorporates personalized or customized images, including hand-written signatures, into existing e-mail messages, web-based e-mail messages or electronic greeting cards. Specifically, the e-mail customization system, also known as Sign-it, generates customized software that integrates with existing e-mail systems and that provides the ability to select different handwritten signatures and manipulate various attributes of the signature. Once a signature is selected, the signature is included in e-mail sent from the user. A recipient e-mail system, such as one capable of displaying HTML e-mail messages, views the e-mail message with the signature. This signature provides a readily discernable visual queue indicating the sender of the e-mail message. In case the recipient's e-mail system does not recognize HTML formatted messages, a clean copy of the e-mail message and an alternate text version of the image is added to the HTML message.

In accordance with methods consistent with the present invention, a method is executed by a data processing system. According to this method, the data processing system receives a form that includes an image into the data processing system, and generates customized software that includes the image.

In accordance with methods consistent with the present invention, a method is performed by a client computer for generating software. This method transmits a form including an image from the client computer to a server computer and receives customized software that includes the image from the server.

In accordance with methods consistent with the present invention, a method is performed by a client computer for making images available for insertion into an electronic mail message. This method transmits a form including an image to a server computer and receives customized software from the server that includes the image.

In accordance with methods consistent with the present invention, a method is provided of completing forms. This method generates a form that includes information associated with a user, sends the form to a client computer such that the user adds additional information to the form, and receives the form from the client computer including the additional user information.

In accordance with methods consistent with the present invention, a method is provided for managing forms. According to this method, a client computer receives the form containing user information from a server computer, displays the form on the client computer using a browser, receives additional user information into the form, and sends the form including the additional user information to the server computer.

In accordance with methods consistent with the present invention, a method is performed by a computer system connected to a communication mechanism for monitoring the communication mechanism. In this method, a form is sent from the computer system through the communication mechanism. and back to the computer system. The computer system determines whether a form has been received in an uncorrupted state and detects that an error has occurred when it is determined that the form has not been received in an uncorrupted state.

In accordance with methods consistent with the present invention, a method for processing a form is provided. The data processing system has a form including a first detection area and a second detection area. This method examines the first detection area to determine whether the expected data is contained in the first detection area, examines the second detection area to determine whether the expected data is contained in the second detection area, and determines that the form is unrecognizable when it is determined that the second detection area also does not contain the expected data.

In accordance with methods consistent with the present invention, a method is provided for verifying an e-mail message. This method receives user input containing an e-mail address into the data processing system, sends a message to the e-mail address to verify the e-mail address, determines whether an indication that the message was undeliverable is received within a predetermined period of time, and determines that the e-mail address is invalid when the indication is received within the predetermined period of time.

In accordance with methods consistent with the present invention, a method, executed by a data processing system, is provided for processing an image with attributes. This method modifies at least one of the attributes of the image to make a resultant image responsive to user input, stores the image persistently on a secondary storage device, and retrieves the image from the secondary storage device responsive to user input requesting a reversal of the attribute modification.

In accordance with methods consistent with the present invention, a method, executed by a data processing system, is provided for processing an image within an image area and a tolerance limit for cropping an image. This method locates within the image area a crop area that contains the image having minimal whitespace, expands the crop area by the tolerance limit, and crops the expanded crop area.

In accordance with methods consistent with the present invention, a method is provided for managing forms. This method displays a first form in a browser. The first form contains information and a link to a second form. The method then receives user input, selects the link to the second form, and displays the second form in the browser. The second form contains the same information as contained in the first form and the second form is sized differently than the first form.

In accordance with methods consistent with the present invention, a method is executed by a data processing system for processing a form. The form contains a first barcode and a second barcode containing information identifying a user. This method receives the form into the data processing system, extracts the first and second barcodes from the form, determines whether the first barcode is readable, and examines the second barcode when it is determined that the first barcode is unreadable to identify the user.

In accordance with methods consistent with the present invention, a method is provided in a server computer. The method generates a form containing information suitable for transmission by a facsimile machine responsive to user information including a phone number of the facsimile machine, sends the form to a remote device located via the facsimile machine and receives the form with additional user information from the remote device.

In accordance with methods consistent with the present invention, a method is provided in a data processing system. According to this method, a handwritten image is received into the data processing system and the handwritten image in incorporated into an electronic greeting card.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 7A depicts an electronic order form interface in accordance with methods and systems consistent with the present invention;

FIG. 7E depicts pre-printed order form interface in accordance with methods and systems consistent with the present invention;

FIG. 19 depicts an electronic greeting card in accordance with methods and systems consistent with the present invention;

DETAILED DESCRIPTION

Figure 1:
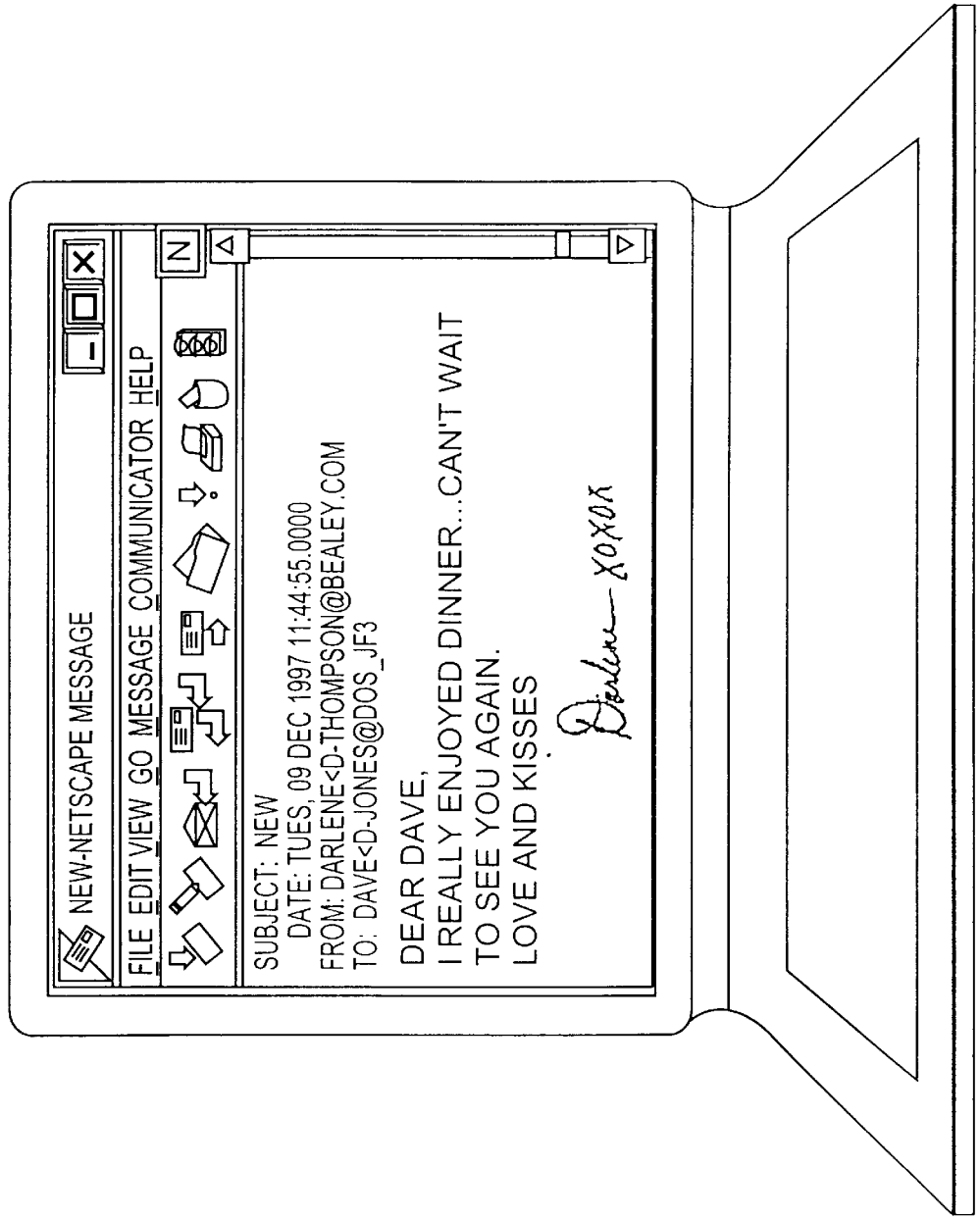
FIG. 1 depicts an example electronic mail message in accordance with methods and systems consistent with the present invention.

The following detailed description of the invention refers to the accompanying drawings. Although, the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview

Methods and systems consistent with the present invention provide an e-mail customization system that allows a user to incorporate into their e-mail messages personalized images, such as their signature. By including such personalized images, the recipient can immediately identify the sender, and accordingly, the e-mail message becomes a more personalized method of communication.

To use the e-mail customization system, a user accesses a web site, known as the e-mail customization web site. This web site contains instructions and the necessary electronic forms for the user to fill out to use the e-mail customization system. An electronic form is a displayable document with the ability to receive user input (e.g., a web page). Upon accessing the e-mail customization web site, the user enters information into an electronic form including their e-mail address, their name, the number of desired images they want, an alternate text for each image, and a payment method (e.g., credit card information). The alternate text is text that will be displayed in lieu of the image if the recipient's e-mail system is not HTML compatible. The alternate text is not required to personalize an e-mail message and may be optionally included. As a precaution to mistyped e-mail addresses, the e-mail customization system verifies the entered e-mail address by examining it to determine if it contains valid characters. If the e-mail address contains valid characters, the e-mail customization system performs a second level of verification by sending a message to the e-mail address. If the e-mail address is invalid, the e-mail customization system will receive a response from the network indicating that the message is undeliverable. Thus, the e-mail customization system waits a predetermined amount of time for such a response, and if one is not received, the e-mail address has been verified.

Once the e-mail address has been verified, the e-mail customization system dynamically creates an electronic signature form that the user uses to input their desired image (e.g., signature) to the system. The electronic signature form is a printable formatted document, for example an HTML formatted document. The signature form is customized for that particular user and thus contains user identification information such as a customer number. This information is encoded using two barcodes. A barcode is an identification code printed as a set of bars of differing width. The identification code may include numbers, letters, or a combination of the two. Additionally, the signature form has a number of image areas with matching alternate text areas for each image area and the user's e-mail address (which has already been verified). The image areas are where the user enters their desired image, and the alternate text areas are where the alternate text from the electronic form is placed. The signature form also contains a proprietary rectangular image and four cornerstones at each corner of the form. The rectangular image identifies the form as a signature form, and the cornerstones are placed on the signature form as reference points so that the e-mail customization system can locate data relative to those points. Since the signature form is an HTML formatted document, the user may display the signature form on a standard HTML browser. To ensure that the signature form appears the same on each browser, instead of plain text letters, images are used to display text using either a separate image for each text letter or a single image for the entire text, and tables are used to size the signature form by using the well known HTML "<table>" tag.

After viewing the signature form, the user prints the form on a local printer, fills out the form, signs the printed form, and faxes the form back to the e-mail customization system for processing. This form includes the user's handwritten image (e.g., signature) that will be included in their e-mails. If the user has difficulty displaying or printing the signature form within the browser (e.g., if the signature form is too small, too large or if the user does not have a printer), the user may request to have the signature form faxed to them, or the signature form may be displayed as an image with a link to a resized image. Additionally, a user may fill out and fax a pre-printed form to the e-mail customization system. Each pre-printed form contains unique user identification.

Once the e-mail customization system receives the fax from the user, it verifies that the form is a signature form, and if so, it extracts and stores the information on the signature form into a database. During verification, the e-mail customization system attempts to locate the cornerstones at each corner of the signature form. If the cornerstones are located, the e-mail customization system may continue with the information extraction. However, if the e-mail customization system cannot locate the cornerstones, the e-mail customization system assumes that there is a problem with the signature form. For example, the form may be a "shrunken form," which occurs when the signature form is printed by the user in a reduced size. The signature form could be printed by the user in a reduced size if the user changes font settings in either the browser, or in the operating system. In this situation, the e-mail customization system searches in areas of the form where it could expect to see the barcodes if the form were a shrunken form. If the e-mail customization system locates both bar codes, the e-mail customization system extracts them. However, if the e-mail customization system cannot find both barcodes, the e-mail customization system assumes that there was a problem with the transmission, notifies the user via an e-mail message, fax, or phone call, and discards the form.

If the barcodes are located and extracted, the image areas containing the user's desired images are extracted. With the extracted data, the e-mail customization system generates customized software that will be integrated into the user's e-mail system to incorporate their desired image into each e-mail that they send. This customized software takes the form of a "plug-in," which is a software program that enhances an application by giving the application special capabilities. The e-mail customization system creates the customized software for the user by wrapping and bundling the images with an installation program and secondary files into a self-extracting executable. The installation program installs the customized software on the user's computer, and the secondary files include both a management tool program for use in adjusting the image and plug-in files that integrate with the user's e-mail system to provide the capability to personalize e-mail messages. The user is notified of the completion of the customized software via an e-mail message that includes a link to a password-protected web site. The user may then access this site and download the customized software.

Once the user downloads the customized software, the user may execute the installation program, install the customized software into various e-mail clients, and begin sending e-mail messages which incorporates the images as depicted in FIG. 1. The customized software allows the user to select and change attributes of the selected image, such as the color, the size, or the style of the selected image. One skilled in the art will appreciate that other attributes may exist, such as blinking or rotating the image. When adjusting an attribute, the customized software must reprocess the image each time. Thus, to enhance speed and efficiency in modifying the images with specialized attributes, the customized software retains incremental cached copies of previous images with the modified attributes in a persistent storage area. As a result, if the user reverses an attribute change, the premodified version of the image appears instantaneously, regardless of whether there was an intervening shut down of the user's computer.

The customized software also utilizes a specialized cropping method when changing the attributes of the selected image to ensure that the entire image is retained while minimizing the amount of white space surrounding the image. When the image is at or near the edge of the image area, the cropping method extracts the image without extracting part of the edge of the image area and discarding that portion of the image.

The e-mail customization system has many components, each of which is subject to failure like any electo-mechanical device. Thus, to ensure that the system remains operational, the e-mail customization system is continuously monitored. To discover a problem with the e-mail customization system (e.g. the e-mail customization system ceases processing images), the email customization system periodically faxes a special signature form with one barcode to itself. If the e-mail customization system is functioning, the special form will be logged in the database as received. However, if the special form is not logged, then technical personnel are notified of the situation by e-mail.

System Components

Figure 2:
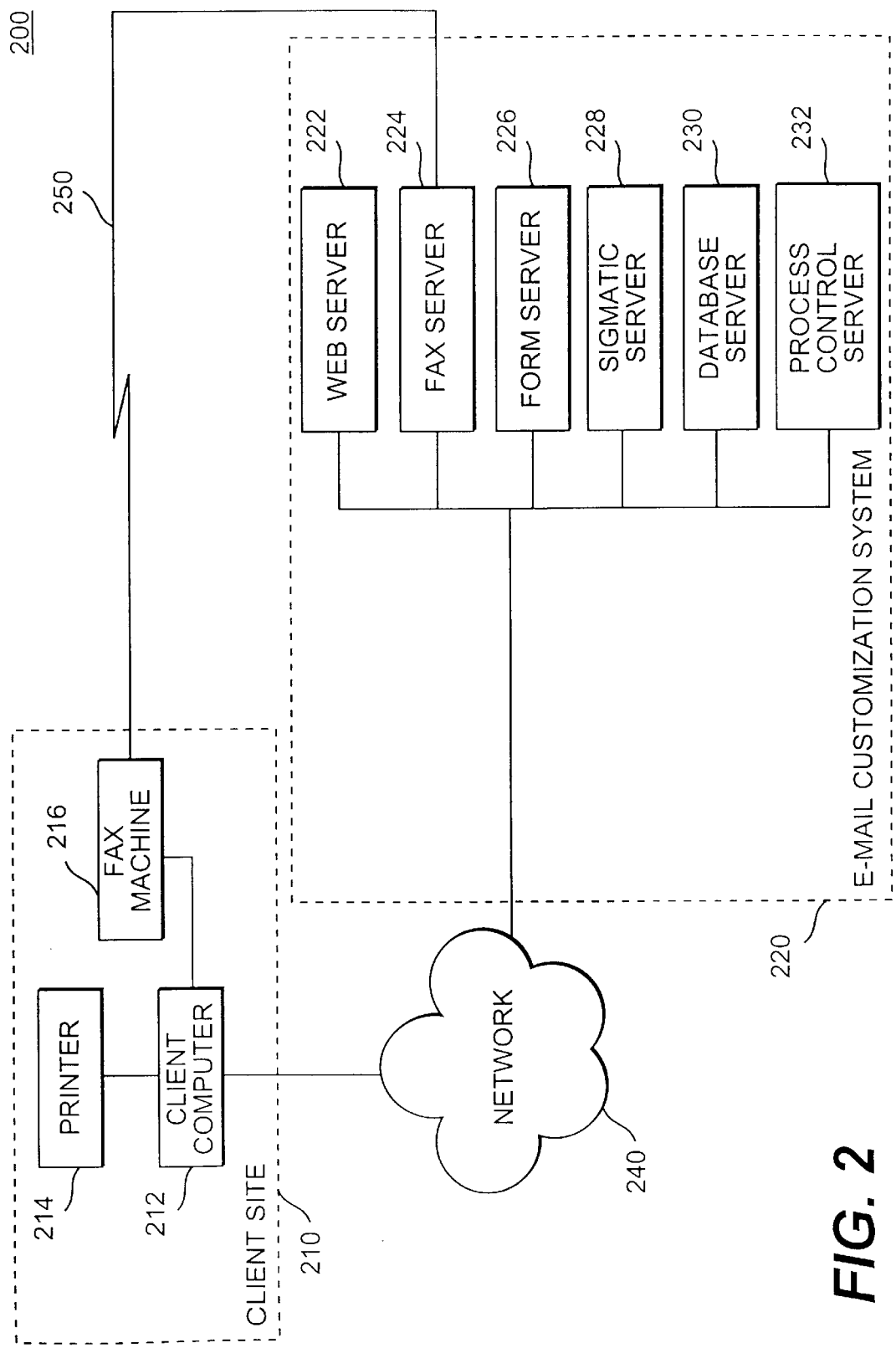
FIG. 2 depicts a data processing system suitable for practicing methods and systems consistent with the present invention.

FIG. 2 depicts a data processing system 200 suitable for practicing methods and systems consistent with the present invention. Data processing system 200 comprises various components at a client site 210 connected to e-mail customization system 220 via a network 240, such as the Internet. At client site 210 is located a client computer 212, a printer 214, and a fax machine 216. The user uses client computer 212 to submit personal information to e-mail customization system 220 to install the customized software. A user using client computer 212 also uses printer 214 to print the signature form received from e-mail customization system 220. Fax machine 216 is used to send the signed signature form to e-mail customization system 220 using standard telephone communication line 250.

E-mail customization system 220 has much of its processing distributed over a number of server computers, including a web server 222, a fax server 224, a form server 226, a sigmatic server 228, a process control server 230, and a database server 232. Such a distribution improves overall system reliability. Further, e-mail customization system 220 is designed with redundancy by running parallel servers for the same functionality. For example, although only one server computer of each kind is depicted, e-mail customization system 220 may contain many more server computers of each kind. This robust design creates a system with a low likelihood of system failure.

Web server 222 transmits and receives web pages from a browser on the client computer 212 using HTML. These web pages may include the electronic order form or the signature form. Fax server 224 receives facsimile copies of completed signature forms from fax machine 216 at client site 210 over communication line 250 and stores the copy as an image file in a directory on its secondary storage device. Fax server 224 may also send the signature form to fax machine 216 when the user does not have access to a printer at client site 210.

Form server 226 monitors the directory of fax server 224 for an incoming image file. Once form server 226 detects such an image file, form server extracts the images and the barcodes from the image file, and stores them in a database. After all the images have been stored, sigmatic server 228 creates the customized software by accessing the database to obtain appropriate user information. Then, sigmatic server 228 bundles the images, installation program, and secondary files into a self-extracting executable software for the user. Process control server 230 receives the completed customized software from sigmatic server 228 and allows a user to retrieve the customized software by downloading it over the Internet. Database server 232 contains a database that stores the received images by fax server 224 and user information.

Although only one client computer 212 is depicted, one skilled in the art will appreciate that data processing system 200 may contain many more client computers and additional client sites. One skilled in the art will also appreciate that client computer 212 may come with the customized software already installed.

Figure 3:
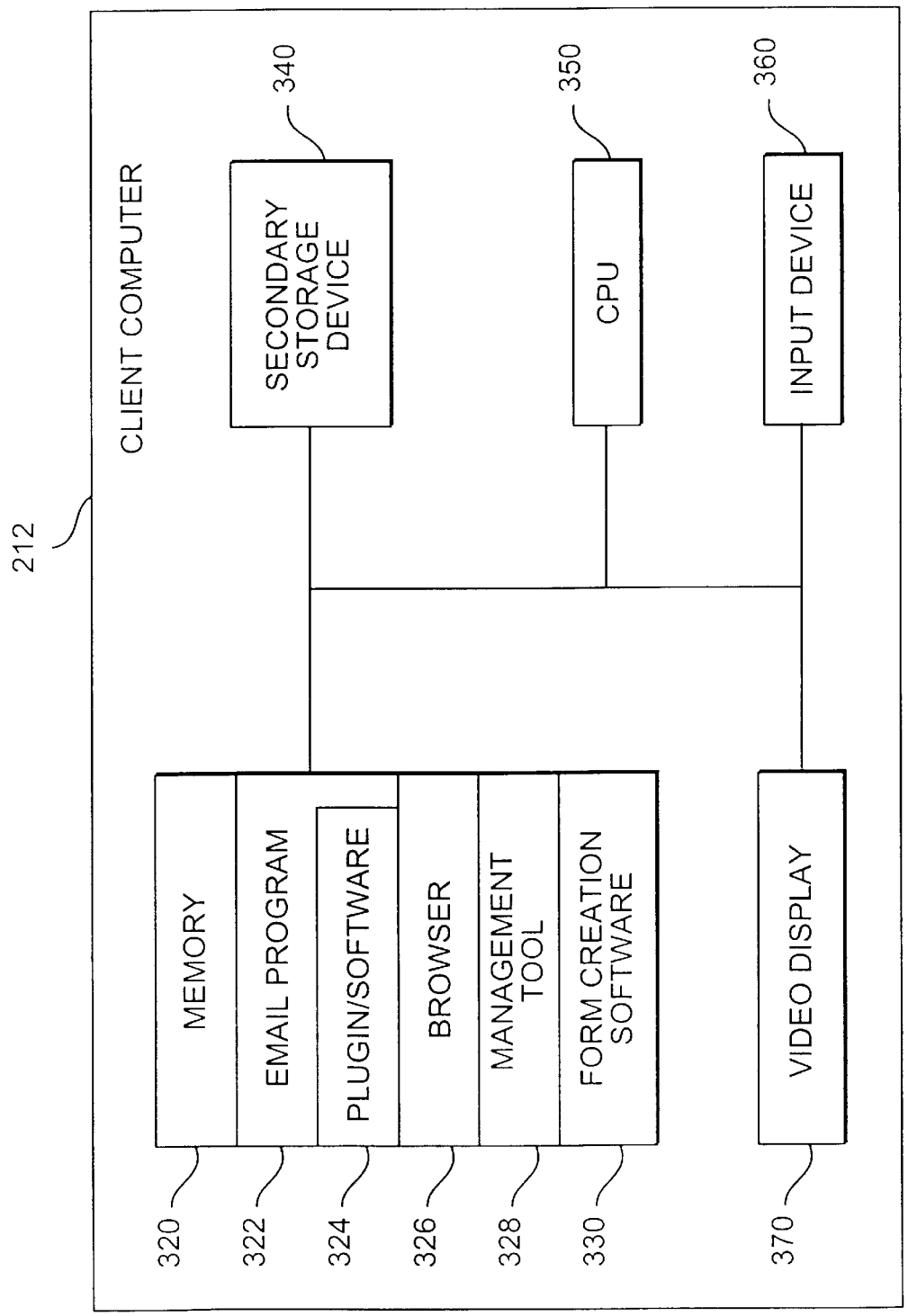
FIG. 3 depicts a more detailed diagram of the client computer depicted in FIG. 2.

FIG. 3 depicts a more detailed diagram of client computer 212, which contains a memory 320, a secondary storage device 330, a central processing unit (CPU) 350, an input device 360, and a video display 370. Memory 320 includes e-mail client program 322 that allows a user to send e-mail messages, browser 324 that allows users to interact with web server 222 by transmitting and receiving files, and management tool 328 that allows the user to interface with the customized software. E-mail program 322 includes customized software 324 downloaded from web server 222 that allows a user to personalize e-mail messages with an image. An example of an e-mail program and a browser suitable for use with methods and systems consistent with the present invention is the Netscape Communicator and Netscape Navigator browser, both from Netscape. Management tool 328 provides an easy way for the user to select and change attributes of the selected image. Memory 320 also includes form creation software 330 that prints pre-printed forms. Form creation software 330 is a Win32 software program using the Win32 API. The Win32 API is used to develop Windows application and contains libraries used to manipulate the device context of attached printers. More information on the Win32 API may be found at "http://msdn.microsoft.com/library/sdkdoc/psdkref/catfunc_5uk9.htm". One skilled in the art will appreciate that other platforms may be used to develop form creation software 330, such as the GTK+ toolkit available from http://www.gtk.org"

Figure 4A:
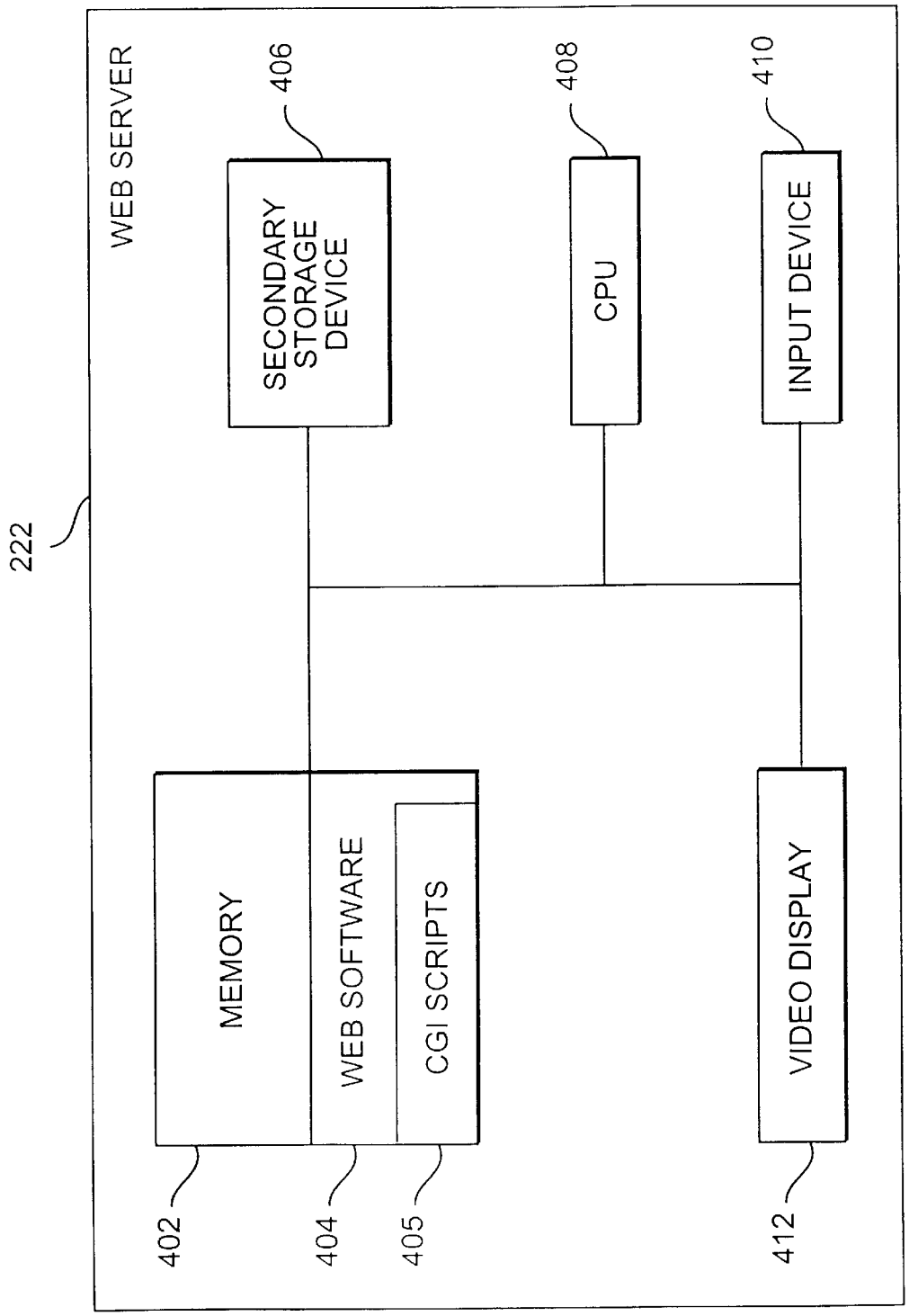
FIG. 4A depicts a more detailed diagram of the web server depicted in FIG. 2.

As shown in FIG. 4A, web server 222 includes a memory 402, a secondary storage device 406, a CPU 408, an input device 410 and a video display 460. Memory 402 includes web software 404 that interacts with client 212 for transmitting and receiving files, such as HTML files. Web software 404 also includes Common Gateway Interface (CGI) scripts 405 to create dynamic HTML files. A CGI script is an external application executed by a web server. A CGI script is invoked when a user submits a request for dynamic information. CGI scripts 405 create an electronic form, and a signature form based on information from a database. An example of web software 404 in web server 222 may be the Apache web server available for download from "http://www.apache.org."

Figure 4B:
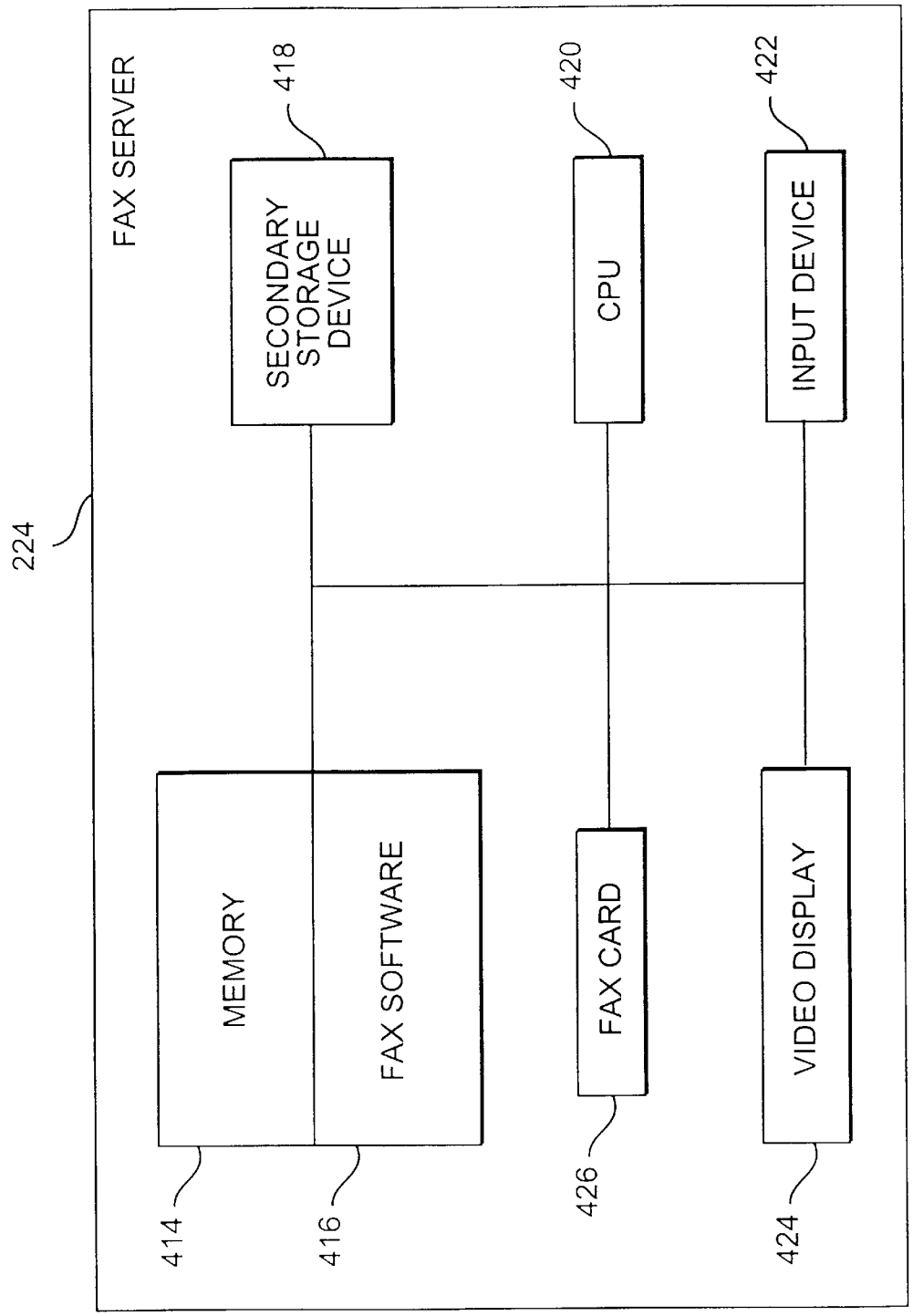
FIG. 4B depicts a more detailed diagram of the fax server depicted in FIG. 2.

As shown in FIG. 4B, fax server 224 is similarly configured to web server 222. Memory 414 includes fax software 416 that receives incoming faxes and transmits faxes to fax machine 212 at client site 210 over communication lines 250. An example of such a program is the Right-Fax Server Software from RightFax, Inc., of Tucson, Ariz. Fax server 224 also contains fax card 426 for sending and receiving faxes.

Figure 4C:
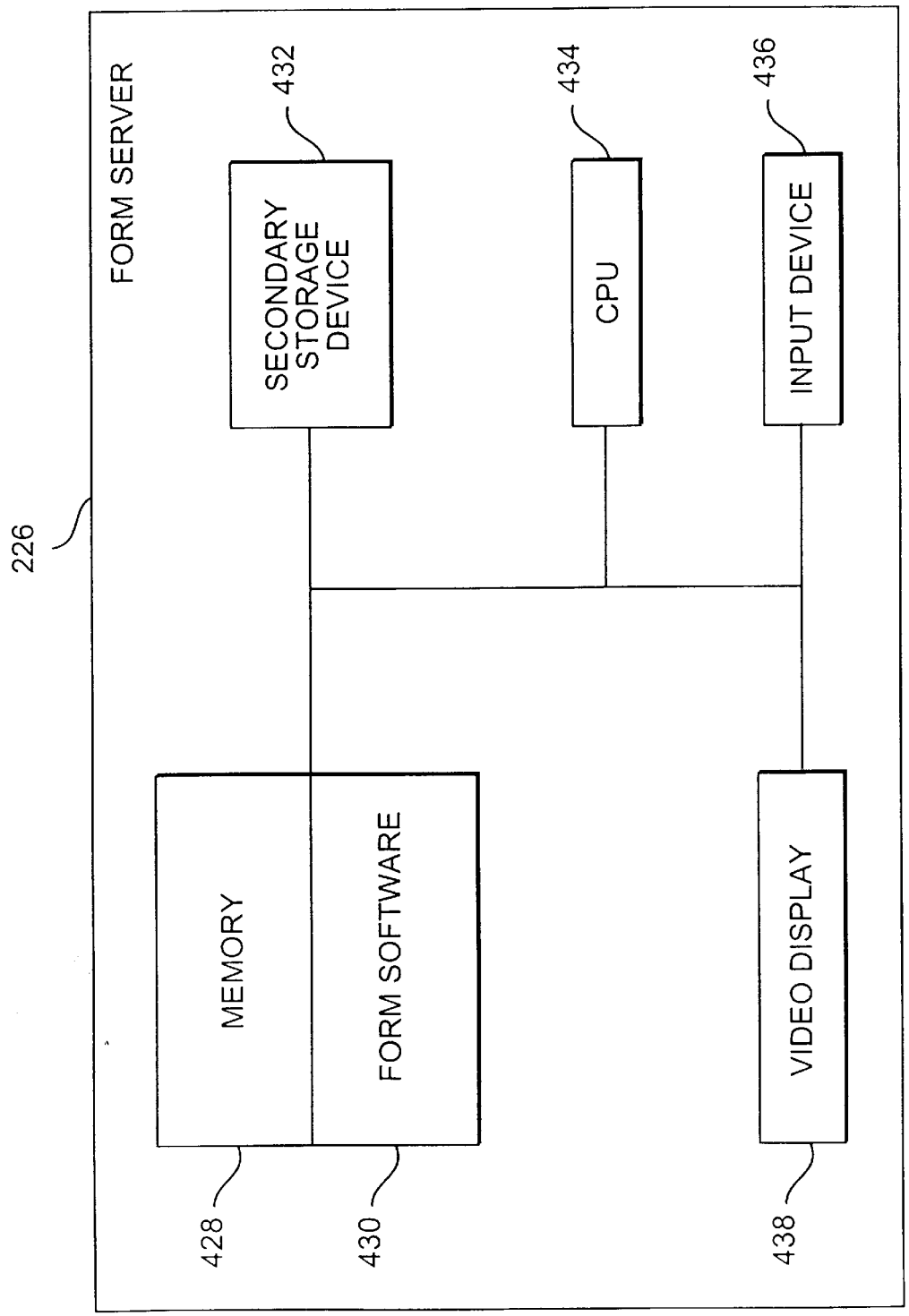
FIG. 4C depicts a more detailed diagram of the form server depicted in FIG. 2.

As shown in FIG. 4C, form server 224 is similarly configured to web server 222. Memory 428 of form server 226 includes form software 430 that reads in an image file and attempts to decode the contents. An example of such a program suitable for use with methods and systems consistent with the present invention is the Teleform Form Processing Software from Cardiff Software, of San Marcos, Calif.

Figure 4D:
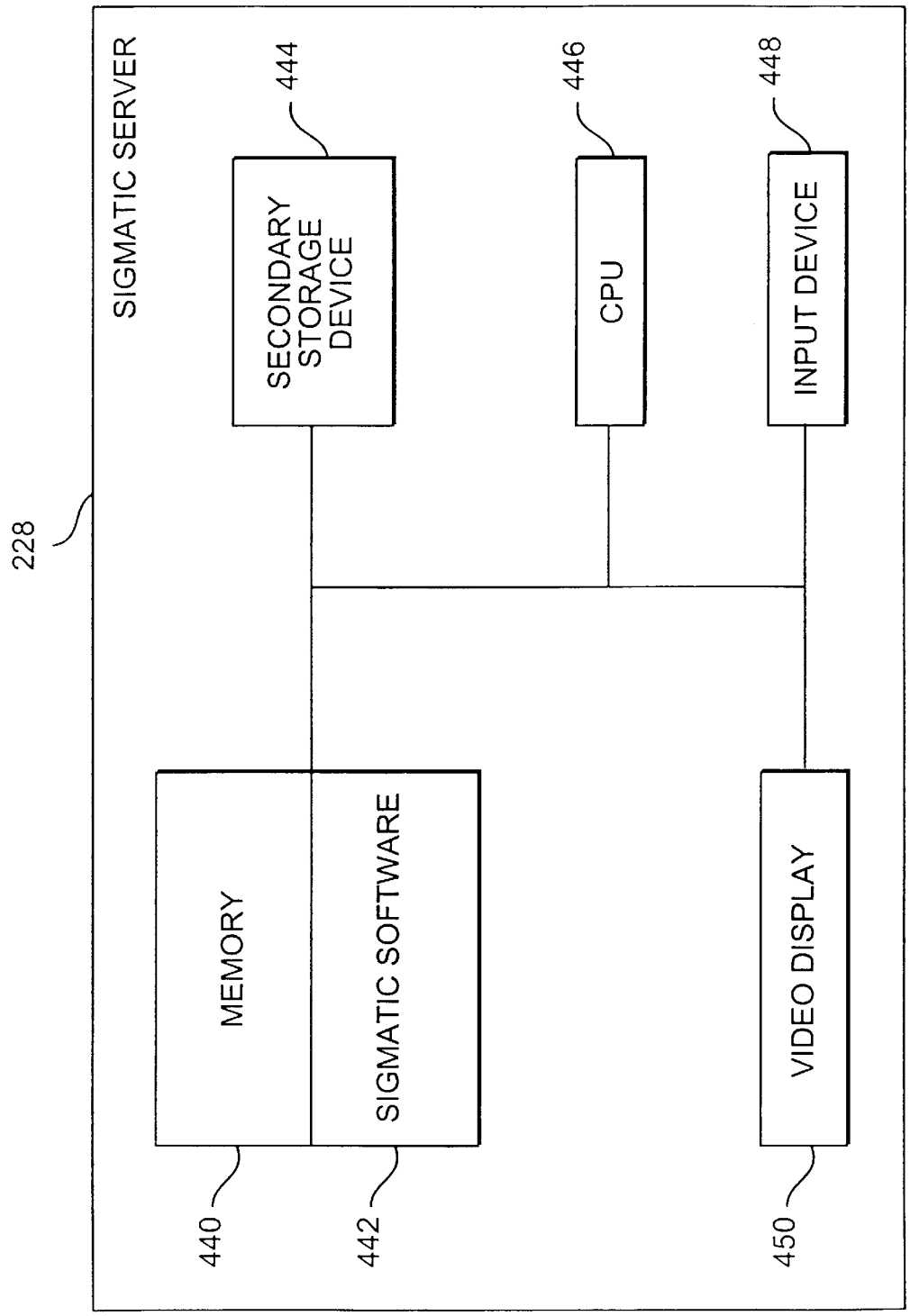
FIG. 4D depicts a more detailed diagram of the sigmatic server depicted in FIG. 2.

As shown in FIG. 4D, sigmatic server 228 is similarly configured to web server 222. Memory 440 of sigmatic server 228 includes sigmatic software 442 that creates the customized software.

Figure 4E:
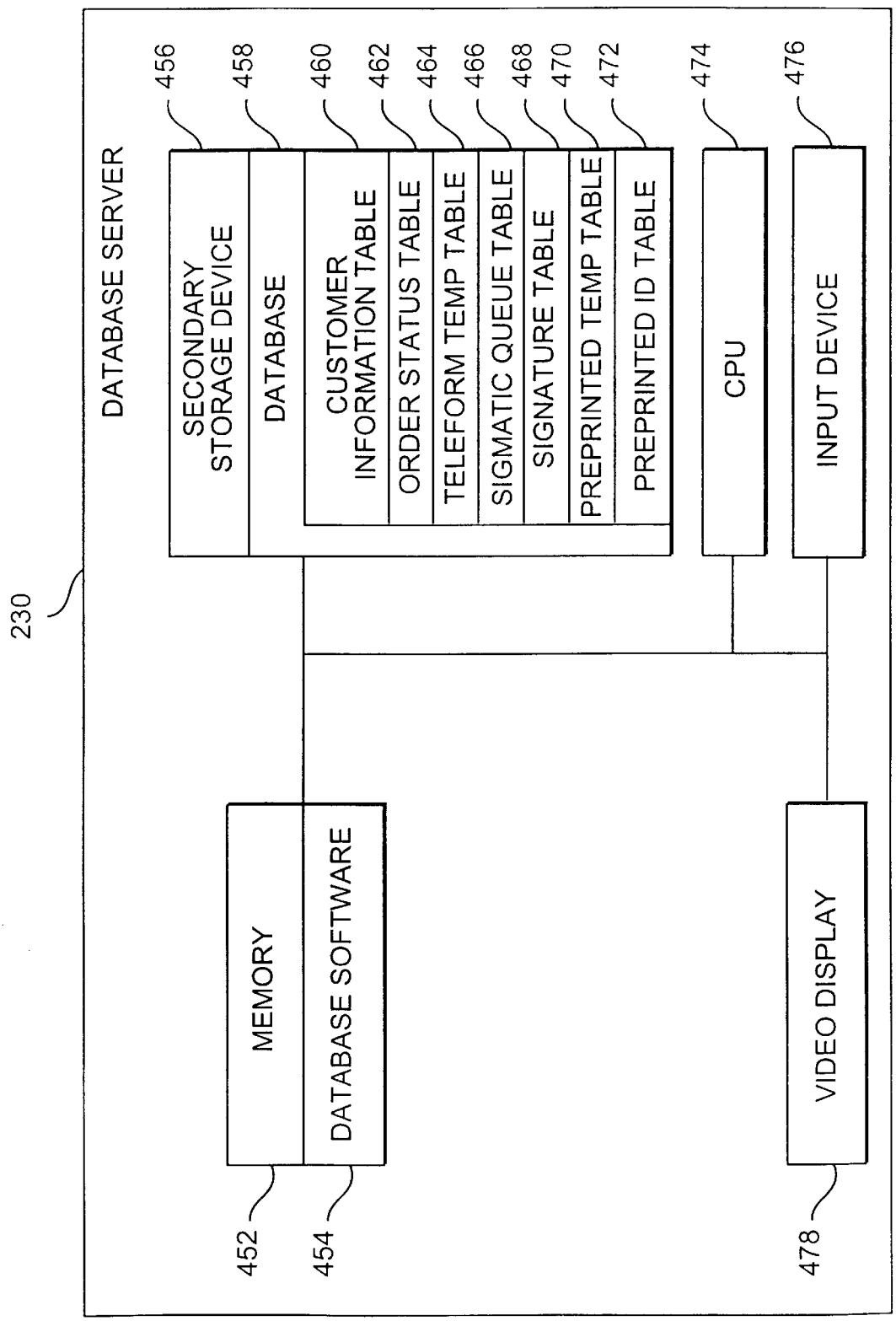
FIG. 4E depicts a more detailed diagram of the database server depicted in FIG. 2.

As shown in FIG. 4E, database server 230 is similarly configured to web server 222. Memory 452 includes database software 454 that provides access to database 458 in secondary storage device 456. An example of such a program suitable for use with methods and systems consistent with the present invention is the Sybase Adaptive Server Enterprise from Sybase, of Emeryville, Calif. Database 458 includes CustomerInformation table 460, OrderStatus table 462, TeleFormTemp table 464, SigmaticQueue table 466, Signature table 468, PrePrintedTemp table 470, and Pre-Printed ID table 472. CustomerInformation table 460 stores information about each user. For example, CustomerInformation table 460 stores a first and last name, address, a numeric identification number and an alphanumeric identification number. The alphanumeric number may be used to generate a barcode on the signature form. OrderStatus table 462 is an event table, such as boolean fields. That is, OrderStatus table 462 contains boolean fields to mark the point at which the automated software production process is executing. One skilled in the art will appreciate that other methods of event handling may be used, such as using a separate table for recording all transactions. TeleFormTemp table 464 and PrePrintedTemp table 470 store the barcodes and images decoded by form server 226. SigmaticQueue table 466 is a shortened form of OrderStatus table 462. This table keeps track of when a payment has been authorized and when all images have been collected. By keeping a subset of fields of the OrderStatus table 462, Sigmatic queue table 466 is accessed quicker. Signature table 468 contains the actual images used to create the customized software and the alternate text messages, associated with each image. Finally, PrePrinted ID table 472 contains information regarding the status of the preprinted forms.

Figure 4F:
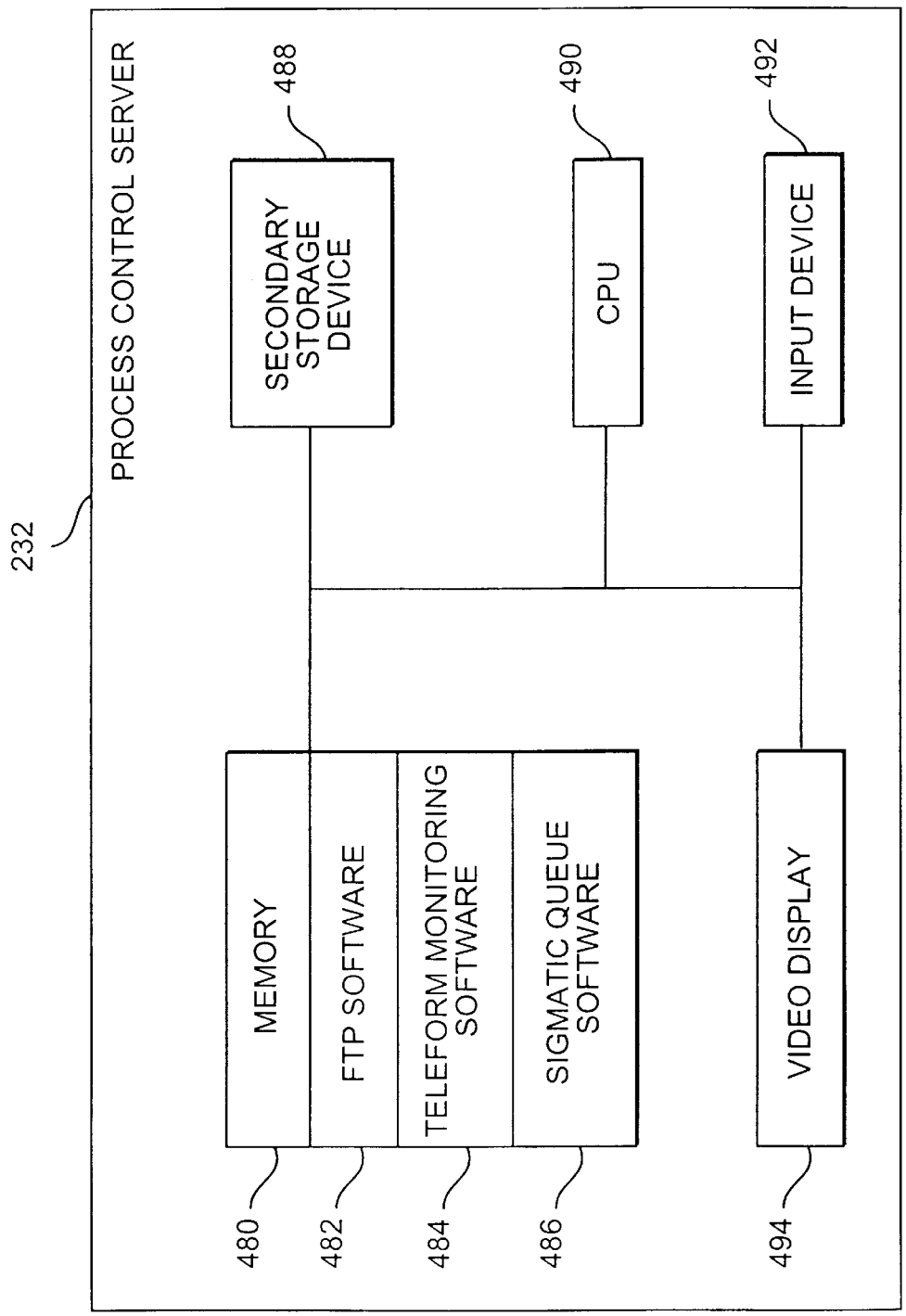
FIG. 4F depicts a more detailed diagram of the process control server depicted in FIG. 2.

As shown in FIG. 4F, process control server 232 is similarly configured to web server 222. Memory 480 of process control server 232 includes file transfer protocol (FTP) software 482 that copies files to and from remote computer systems. Memory 480 also contains teleform monitoring software 484 that monitors TeleFormTemp table 464 for a new entry. Thus, when teleform monitoring software 484 detects a new entry in TeleFormTemp table 464 (e.g. a new signature form has been received), teleform monitoring software 484 extracts the alphanumeric identification number of the user from the barcode, and copies the image to the associated record in Signature table 468. Also contained in memory 480 is sigmatic queue software 486 that monitors SigmaticQueue table 466 for appropriate conditions. Upon detecting an appropriate condition, sigmatic queue software 486 starts the creation of the customized software. For example, when the fields indicate that the user has authorized payment and all images have been placed in the Signature table 468, sigmatic queue software 486 begins a customized software creation process. Sigmatic queue software 486 communicates with sigmatic server 228 by using a Transmission Control Protocol (TCP) on a port designated by 5555.

Although aspects of the present invention are described as being stored in memory, one skilled in the art will appreciate that these aspects may be stored on or read from other computer-readable media, such as secondary storage devices, like hard disks, floppy disks and CD-ROM; a carrier wave received from a network like the Internet; or other forms of ROM or RAM. Additionally, although specific components and programs of client computer 212 and e-mail customization system 220 have been described, one skilled in the art will appreciate that these may contain additional or different components or programs.

Overview of the Automated Production of Customized Software

Figure 5:
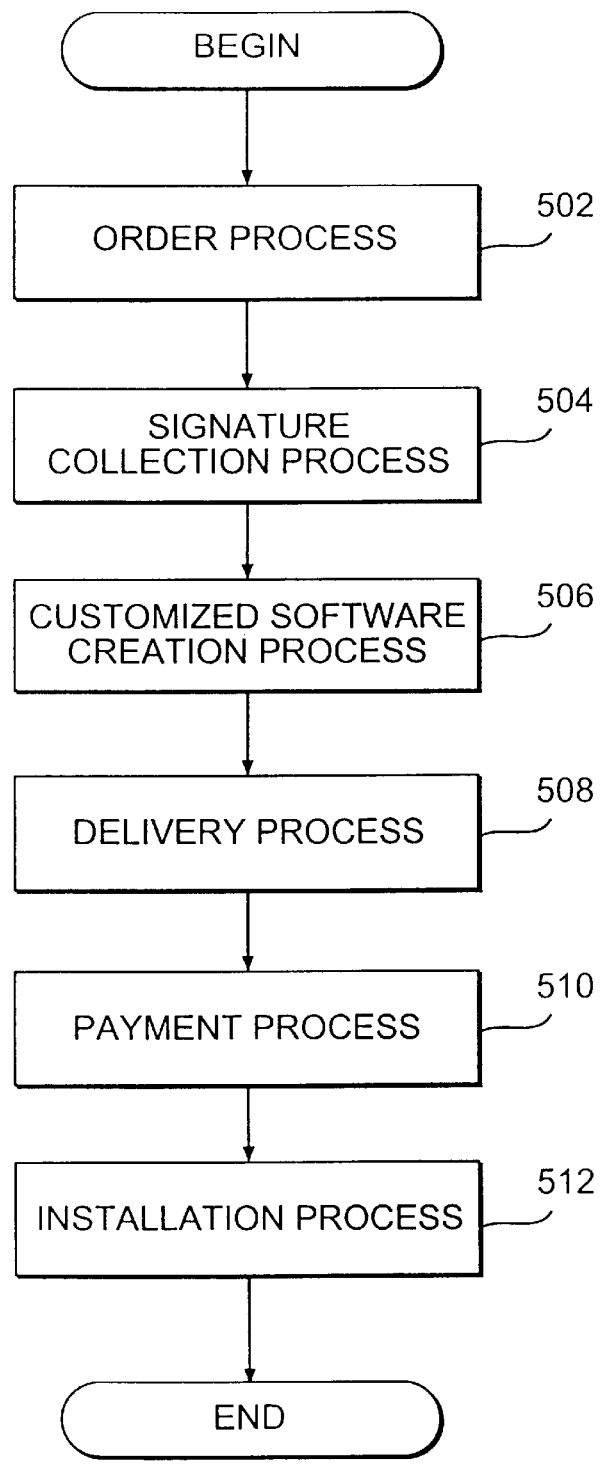
FIG. 5 depicts a flow chart of the steps performed by the data processing system of FIG. 2 when creating a customized software package in accordance with methods and systems consistent with the present invention.

FIG. 5 depicts a flow chart of the steps performed by the e-mail customization system. The automated production of customized software is initiated by the order process (step 502). The order process comprises receiving information from the user and the creation of a personalized signature form. The order process is completed by the user printing the signature form and sending the completed form to the e-mail customization system 220 for processing. When the form is received, the signature collection process is started (step 504). This process entails extracting the images from the form, enhancing the image quality, and placing the images in a database. Next, the images and user information from the database are used to create customized software for the user (step 506). The customized software is created by wrapping and bundling the images, alternate text, an installable software package, and secondary signature files into a self-extracting executable. Once the customized software has been created, the user is notified of the completion of the customized software by e-mail and can then download the customized software package from the e-mail customization system 220 (step 508). Upon a successful delivery, the user's credit card may be processed and a processing organization may transfer payment for the software product (step 510). Finally, the user installs the customized software package on their computer and can use the customized software (step 512). The customized software incorporates features into various e-mail clients by giving the user the ability to add a personalized, handwritten image with alternate text directly to the e-mail message.

Further details and operations of the signature mail customized software production process will now be explained with reference to the flowcharts of FIGS. 6A–6F.

Order Process

Figure 6A:
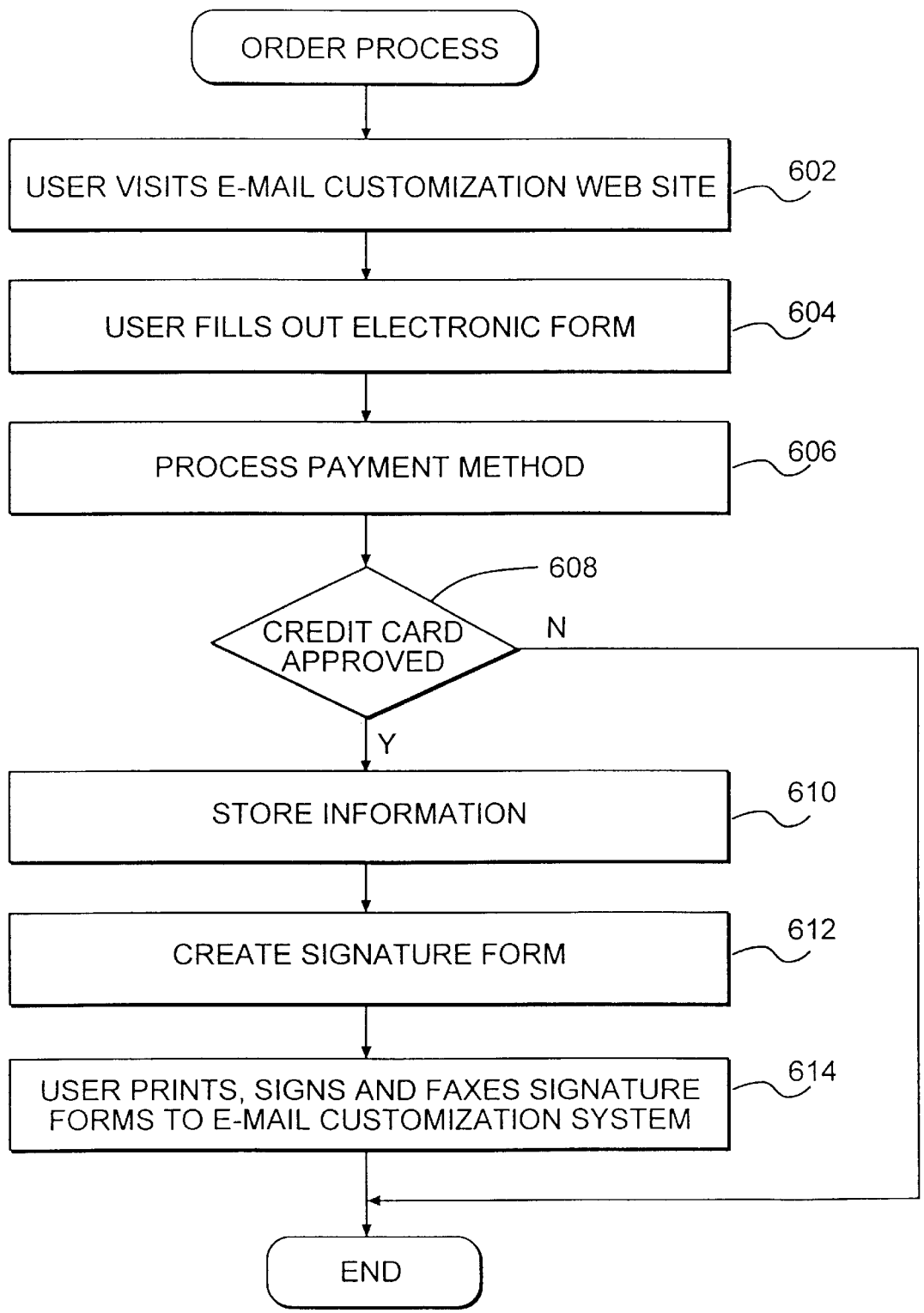
FIG. 6A depicts a more detailed flow chart of the order process depicted in FIG. 5.

As shown in FIG. 6A, order process 502 is initiated, for example, by a user accessing web server 222 at e-mail customization system 220 (step 602). Once accessed, web server 222 transmits an HTML web page to client computer 212. The web page may consist of an explanation of the customized software, and an electronic form for the user to fill out, as shown in FIG. 7A. Once the electronic form is displayed on the user's browser 326, the user can enter various information into the electronic form (step 604). The electronic form requires personal information 702, and alternate text information 704. For example, personal information 702 may include the user's name, e-mail address, operating system type, and e-mail client preference. Alternate text information 704 is required so that when a user sends an e-mail message to a mail client that does not support HTML messages, the recipient of the e-mail may still identify who the sender is by viewing the alternate text information. Once the user enters in the required information and submits the electronic form, web server 222 verifies the user's e-mail address and transmits a confirmation web page including a section requesting payment information (step 606). To verify the user's e-mail address, web server 222 connects to the user's mail server or the Domain Name Service (DNS) and verifies the validity of the e-mail domain name. DNS is the system that translates domain names into numerical IP addresses. For example, the e-mail address "jim@ibm.com" contains the domain name "ibm.com." The e-mail address may also be verified by determining if the e-mail address contains appropriate Internet characters, for example "@" and ".", or the e-mail address may be verified by transmitting a message to the e-mail address, and waiting to see if the message is denied. Once verified, the user fills out the confirmation web page by entering in their credit card number, month and expiration, and submits it to web server 222. To ensure privacy, the user is given a password for all future transactions with e-mail customization system 220, in response to the completed electronic forms. The credit card information is then checked for approval (step 608). One method of approval may be transmitting the user's credit card information to a third party company, such as Cybercash Corp., of Reston, Va. that authorizes transactions. One skilled in the art will appreciate that other approval methods may exists, such as a call center or a phone verification. OrderStatus table 462 is updated to indicate that the order was placed If the credit card is authorized, the personal information is stored into the CustomerInformation table 460, the alternate text information is stored in SignatureTable 468, and the e-mail client preference, operating system type, and password are stored in OrderStatus table 462. Otherwise, if the authorization fails, order process 502 ends (step 610). Also at this point, the user is given a numerical identification number and an alphanumeric identification number so that the user's images, customized software, and information may be easily found within the database.

Figure 7B:
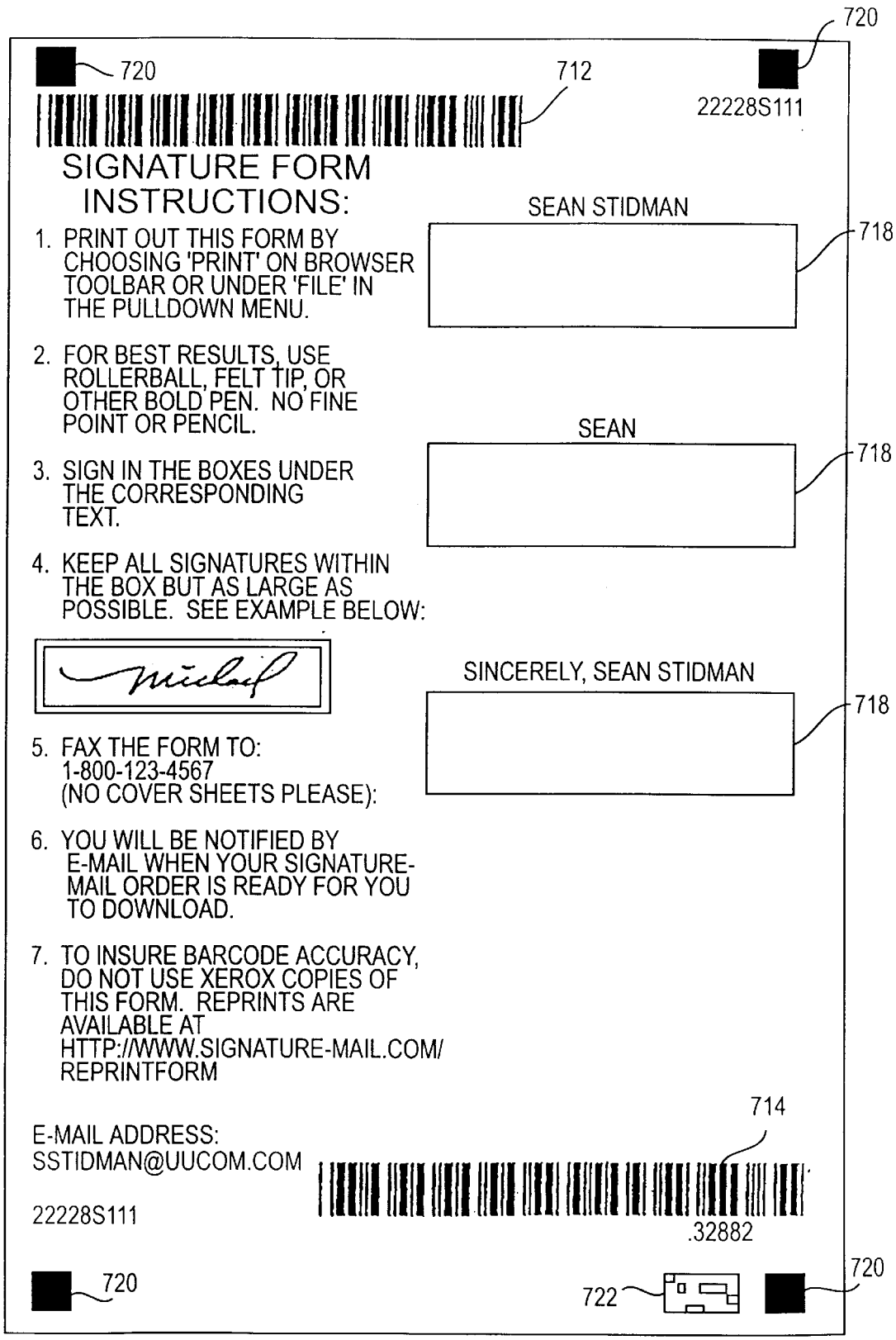
FIG. 7B depicts a signature form in accordance with methods and systems consistent with the present invention.

After the personal information is stored in the CustomerInformation table 460, web server 222 creates and transmits a signature form to the user at client computer 212 (step 612). FIG. 7B depicts a created signature form presented to the user using client computer 212. The signature form is a dynamically created custom form. User alphanumeric identification, alternate text information, order number, form number and e-mail address from CustomerInformation table 460 and OrderStatus stable 462 are used to create the dynamic signature form. The signature form is created using the HTML format and is thus printable from browser 324. Further, the signature form contains HTML tables and images. The use of a tables and images greatly improve the consistency of the signature form when viewed by different browsers. That is, tables and images force the browser to display the signature form a certain way, thus ensuring that the signature form when printed will appear the same size. For example, a table having a width of 400 pixels, regardless of the size of the browser window, will always appear to be 400 pixels wide within the browser, and images instead of text, regardless of the size of the font the user chooses to display, will always appear the same size as well. Alternatively, the signature form may be created using the Portable Document Format (PDF), developed by Adobe Systems, of San Jose, Calif. The PDF format is a defacto standard to transmit printer independent documents over the Internet. The PDF format ensures that the document will appear the same at each client. Yet another method for transmitting the signature form is to create the signature form as a single graphic image. In doing so, HTML code may be accompanied with the image to control the size of the image. If the image appears too small or large on the user's browser, a hypertext link may provide an identical, but resized signature form. One skilled in the art will appreciate that regardless the format of the signature form, when printed the signature form should appear the same size.

Barcodes 712 and 714 are identical and are placed in the top left and lower right to ensure readability. Barcodes 712 and 714 are coded using the "code 39" format. Code 39 is an alphanumeric bar code format for encoding numbers and letters. More information on the code 39 format may be found at "http://www.hp.com/HP-COMP/barcode/sg/Misc/code_39.html." For example, if barcode 712 is undecipherable because of a poor transmission, barcode 714 may still be readable. Further, if both barcodes are corrupted because of a poor transmission, it may still be possible to determine which user is the likely user who sent the signature form when combining both barcodes along with the database. Barcodes 712 and 714 contain six alphanumeric characters representing the customer identification number, one alphanumeric character representing the order number, and one numeric character representing the form type. Each order placed by a user must use a unique order number that is different from all previous orders placed by the user. Thus, a user may have multiple open orders with multiple images in the database. The combination of these alphanumeric and numeric characters allows the teleform monitoring software 484 to read the barcodes and determine the correct user, order number and form number and place the images in the correct location. Item 716 is the text alternate of the image, and item 718 is the area that the form server 226 will extract as the image. Items 712, 714, 716 and 718 are variable and are the part of the signature form eventually extracted. In the case that the number of images that the user requests exceeds five, then multiple signature forms may be displayed in succession on the user's web browser.

Finally, the user prints, signs and faxes the signature form to e-mail customization system 220 (step 614). Alternatively, if the user does not have a printer, the user may elect to have the signature form faxed directly to fax machine 216 from fax server 224. The user may elect this option when initially filling out the electronic form. When the user selects this "fax-back" option, the user is required to enter in the phone number for fax machine 216 at client site 210. Web server 222 then invokes a Common Gateway Interface (CGI) script which creates a signature form using the Printer Command Language (PCL), instead of HTML. The PCL format, developed by Hewlett-Packard, of Palo Alto, Calif. is the defacto standard for communicating with printers. The CGI script also adds additional information to the PCL document to indicate fax machine's 216 telephone number. Once the PCL signature form is generated, it is then placed on a print queue linked to fax server 224 using the Server Message Block (SMB) protocol. The SMB protocol is a well-known protocol used for sharing files, printers, and serial ports between computers. More information on the SMB protocol may be found at "http://samba.anu.edu.au/cifs/docs/what-is-smb.html," which is incorporated herein by reference. Fax server 224 continuously monitors the linked print queue for new PCL signature forms, and when fax server 224 determines a PCL document is on the print queue, the PCL document is removed from the queue and converted to an image suitable for faxing. Fax server 224 transmits the suitable image to fax machine 216 using transmission lines 250. If fax machine 216 is unreachable, the call is retried a number of times indicated by the CGI script. Regardless of the method used to produce the signature form, the signature form is created according to a template form located on form server 226, ensuring accurate decoding and extracting during the collection process.

Collection Process

Figure 6B:
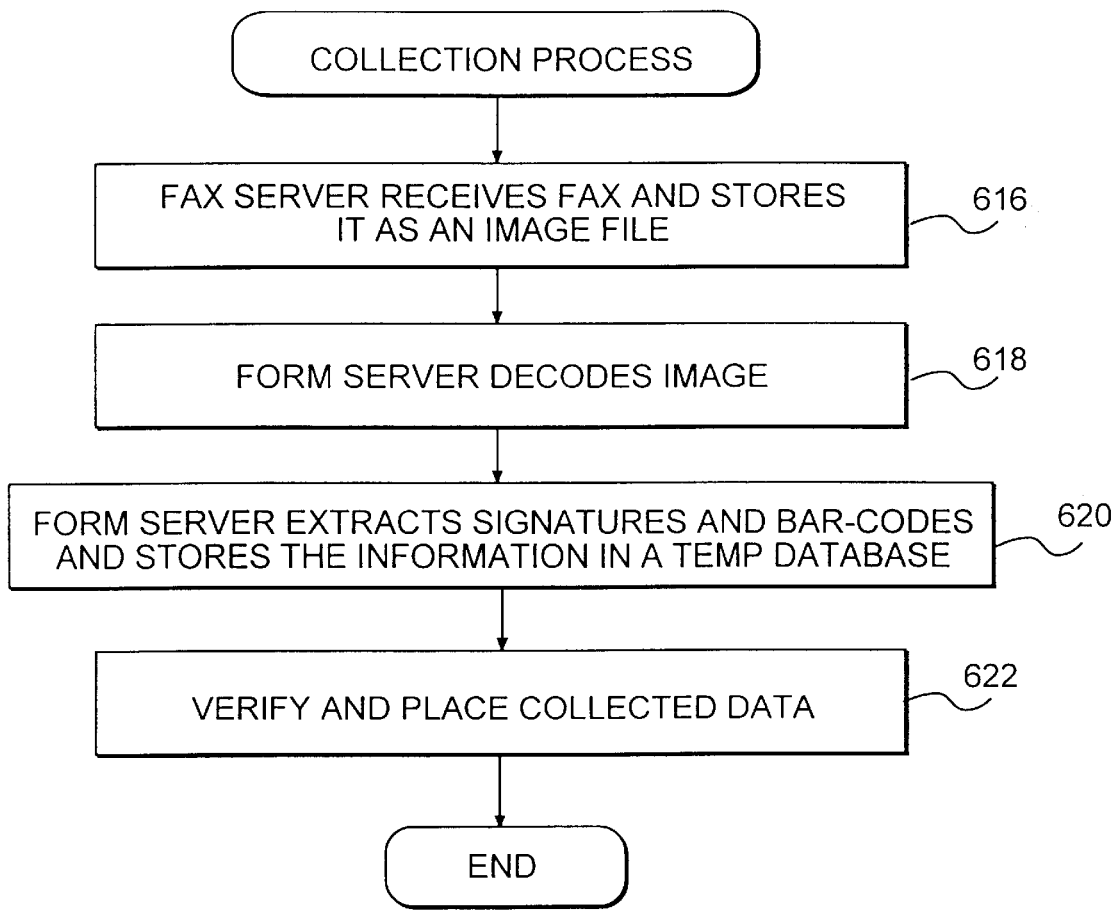
FIG. 6B depicts a more detailed flow chart of the collection process depicted in FIG. 5.

As shown in FIG. 6B, after the order process is completed, and the user transmits a completed signature form to fax server 224 at e-mail customization system 220, the collection process begins. Collection process 504 is initiated, for example, by fax server 224 receiving the completed signature form (step 616). Fax server 224 receives the fax as a Tag Image File Format (TIFF) file and stores the TIFF file in a shared directory between fax server 224 and form server 226. The TIFF format is an image format commonly used for scanning images. The shared directory allows form sever 226 to monitor for new incoming TIFF files.

Once form server 226 detects a new TIFF file in the shared directory, form server 226 attempts to decode the image in the image file (step 618). To decode the image, form server 226 first cleans the image of extraneous lines, spots, and other impurities added by the fax transmission. Next, form server 226 attempts to locate the four cornerstones on the image. The four cornerstones are placed in the upper left, lower left, upper right, and lower right of the signature form, and define the outer boundary of the signature form, as depicted in FIG. 7B as items 720. Once the cornerstones are located, form server 226 locates a proprietary rectangular image at the bottom right corner of the image, as depicted in FIG. 7B as item 722. The proprietary rectangular image indicates that the image is in fact a signature form and also serves as an identification symbol to uniquely identify the type of form. If form server 226 cannot determine that the image is a signature form, form server 226 attempts to .determine the type of image received. That is, form server 226 will assume that the image received may be a shrunken version of the signature form. A shrunken form may be easily detected by moving the detection area on the image. For example, in a shrunken form, barcode 714 will appear at a location up, and to the left from the expected location. However, if form server 226 cannot interpret the received image, an e-mail message may be sent to the user describing the problem. One skilled in the art will appreciate that there are other techniques that maybe used to determine variant forms.

Upon form server 226 identifying the image as a signature form, form server 226 locates and extracts the bar codes 712 and 714 and the image areas 718 and stores the extracted information in TeleFormTemp table 464 at database server 232 as a record (step 620). Form server 226 transfers the information to database server 232 by using the Open DataBase Connectivity (ODBC) standard. The ODBC standard is the defacto standard for accessing various databases. More information on the ODBC standard may be found at "//www.microsoft.com/data/reference/odbc.htm," which is incorporated herein by reference. Form server 226 uses a cropping method to extract the images from image areas 718.

Teleform monitoring software 484 monitors the TeleFormTemp table 464 for new entries and verifies the contents of each entry (step 622). Teleform monitoring software 484 compares barcodes 712 and 714 with each other to ensure the data is reliable. If either of the barcodes is readable, teleform monitoring software 484 extracts the customer identification number, order number and form number from barcode 712 or barcode 714 and copies the extracted customer identification number and image from image area 718 into a record in Signature table 468, and the order number and form number are placed in OrderStatus table 462; otherwise, if unsuccessful, teleform monitoring software 484 searches CustomerInformation table 460 for a partial match of the contents of barcodes 712 and 714, and if still unsuccessful, the teleform monitoring software assumes there was a bad transmission and discards the entire record from the TeleFormTemp table 464. Once the information has been added to Signature table 468, OrderStatus table 462 and SigmaticQueue table 466 may be updated to indicate that all images have been stored in Signature table 468. Finally, in the last step of collection process 504, the processed record from TeleFormTemp table 464 is removed.

Customized Software Creation Process

Figure 6C:
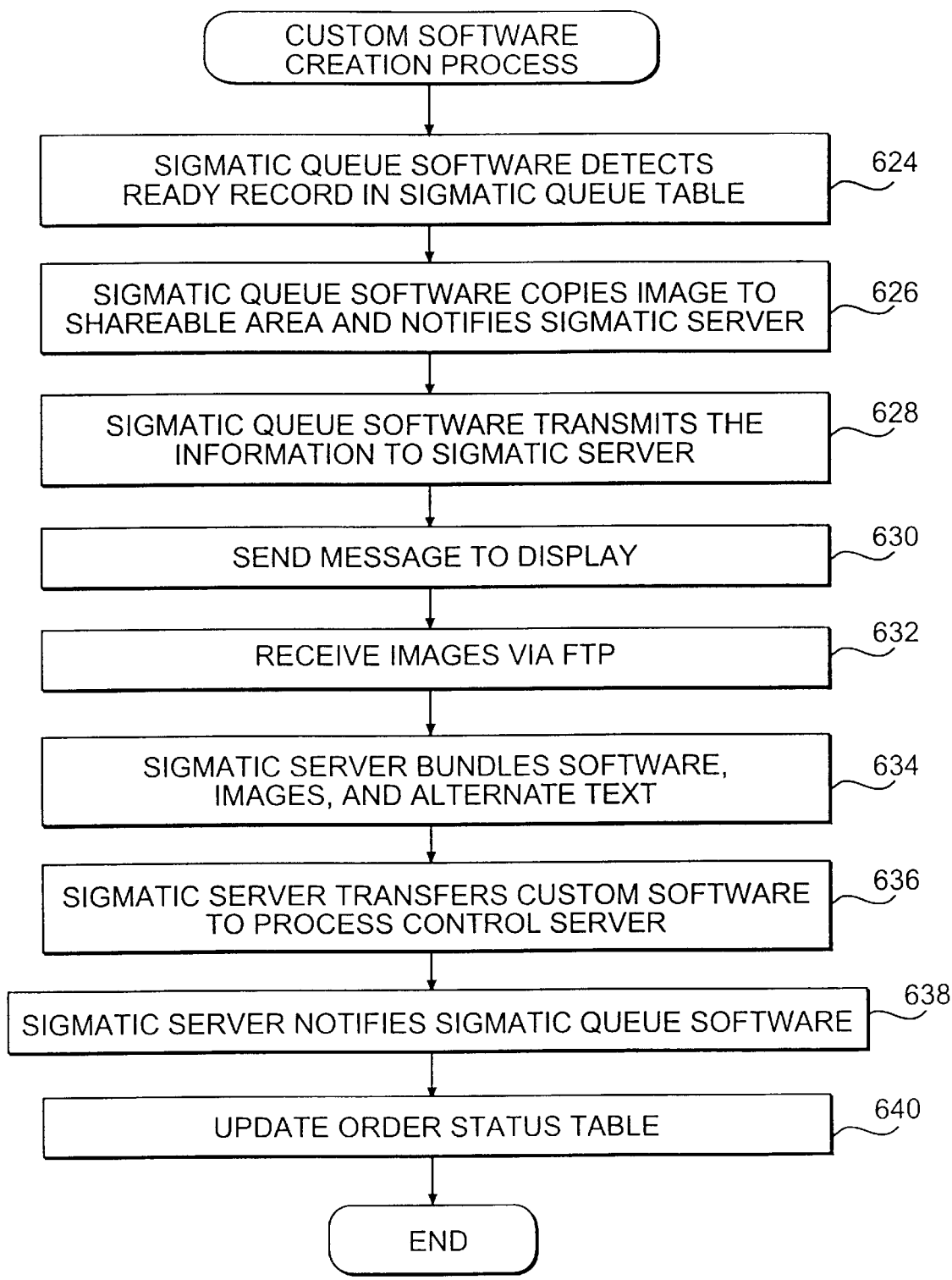
FIG. 6C depicts a more detailed flow chart of the creation of customized software process depicted in FIG. 5.

As shown in FIG. 6C, once all the images have been received in Signature table 468, the customized software creation process begins. Sigmatic queue software 486 monitors SigmaticQueue table 466 for a ready record (step 624). A ready record occurs when payment has been authorized and all images have been collected. Payment authorization may be performed by a separate process communicating with Cybercash to determine if the user's credit card is valid and usable. Once authorized, the payment field in SigmaticQueue table 466 is set to "yes."

Once sigmatic queue software 486 detects a ready record, the sigmatic queue software copies each image from Signature table 468, referenced by the ready record's customer identification number in SigmaticQueue table 466, to a shareable area and notifies the sigmatic server 228 (step 626). The shareable area allows for easy file transfer to sigmatic server 228. Sigmatic queue software 486 also removes the record from the SigmaticQueue table 466 and updates the OrderStatus table 462 to indicate that the customized software creation process 506 has begun. That is, sigmatic queue software 486 changes a boolean field to "yes" in the OrderStatus table 462 to indicate the start of customized software creation process 506.

Once the images have been copied to the shareable area, the information required to create the customized software is sent to sigmatic server 228 using the TCP protocol (step 628). First, the operating system type, e-mail client type, form type and wrapper type are sent to Sigmatic server 228 and stored in a common object. This type information is retrieved from OrderStatus table 462. Each of these types are represented by a single character. For example, the operating system type is set to "0" to representing the Windows 95 operating system, "1" to representing Windows 98 operating system, and "2" to represent the Windows NT operating system. The email client type is set to "zero" to represent Outlook Express, and "1" to represent the Netscape Communicator Messenger client. The wrapper type instructs Sigmatic server 228 which software to use when bundling the files into a single executable file for download by the user. For example, a Windows wrapper may indicate "1," while the Macintosh wrapper may indicate a "2." Further, the form type indicates which signature form the user used. One skilled in the art will appreciate that other form types, operating system types, e-mail types, or wrapper types may exist.

After the common object information is transmitted, sigmatic queue software 486 transmits the customer identification. This information is retrieved from SigmaticQueue table 466 and transmitted by the word "customer ID" followed by the customer identification number. Next, for each signature ordered, sigmatic queue software 486 transmits the physical location of the images in a URL format and the alternate text of the images. For example, a line may begin by the word "alternate text," and the actual alternate text, then the word "image URL," and the location of the image in a URL format. This information is retrieved from Signature table 468.

Once the information required to create the customized software has been transmitted to sigmatic server 228, the Sigmatic server sends a message to video display 450 indicating which customized software is being generated and begins bundling the software (step 630). Next, sigmatic server 228 receives the actual images from the shareable area (step 632). The images are located and referenced by the URL and the FTP protocol is used to perform the file transfer. Upon reception, Sigmatic server 228 converts the images, using well-known techniques, from the original TIFF format to a Graphics Interchange Format (GIF) format and a file is created containing all the text alternates of each image in the order in which they were received from the shareable area. One skilled in the art will appreciate that any type of graphics file format may be used to encode the images, such as the PICT format.

Sigmatic server 228 creates the customized software by bundling the image files, alternate text file, and the required secondary files (step 634). The secondary files are determined by referring to the stored common object. The secondary files include plug-in files for various e-mail systems and a management tool program to select the images. Also bundled with the customized software is an installation program. An example of an installation program is the Installshield Corporation's Installshield version 5 Professional, of Schaumburg, I1. The installation program includes a proprietary scripting language and the required secondary files in order to install the customized software on client computer 212. The completed wrapped software is a self-extracting executable and is the final product which is eventually delivered to the user. After generation of the customized software, the completed customized software is transferred to process control server 232 using the FTP protocol (step 636). Once successfully transferred, sigmatic server 228 notifies sigmatic queue software 486 that no errors occurred while generating the customized software package and sends a successful transfer indicator to sigmatic queue software 486 and then removes all images, and the alternate text files from the sigmatic work directory (step 638). Once the indicator is received, sigmatic queue software 486 updates the boolean fields in the OrderStatus table 462 to indicate that the customized software process has been completed and that the customized software package has been successfully moved to process control server 232 (step 640). This completes custom software creation process 506 and the software is now ready for delivery.

Delivery Process

Figure 6D:
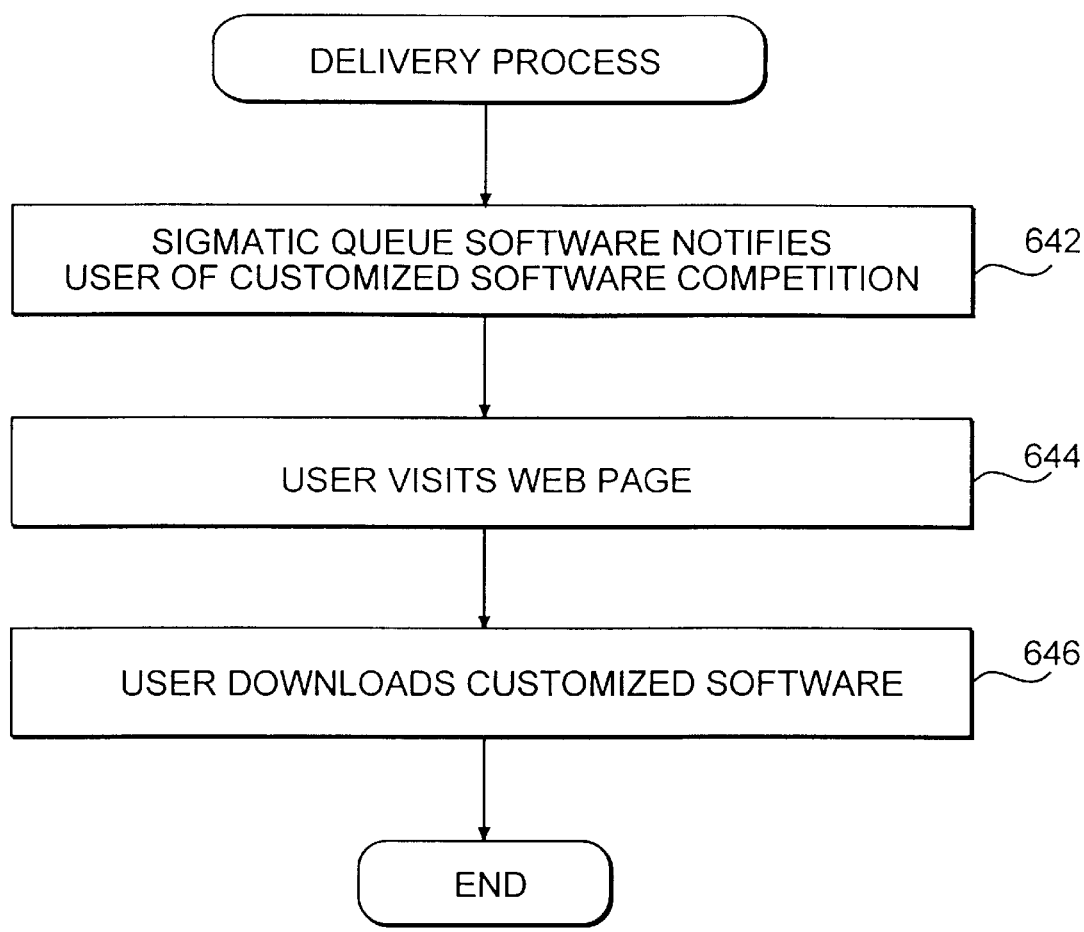
FIG. 6D depicts a more detailed flow chart of the delivery process depicted in FIG. 5.

As shown in FIG. 6D, once the customized software has been moved to process control server 232, the software delivery process begins. Sigmatic queue software 486 sends an e-mail message to the user notifying the user that the customized software is ready for download (step 642). Sigmatic queue software 486 The message indicates that the customized software is completed and includes a URL link to a special web page for the user to retrieve the customized software. Once the user visits the special web page, the user is asked to enter their email address and password to make sure they retrieve the correct software (step 644). The email address and password are verified against CustomerInformation table 460. After verification, the customized software is automatically downloaded to the client computer's secondary storage device (step 646). One skilled in the art will appreciate that other delivery methods may exist. For example, the customized may be delivered on media, such as a CD-ROM, the user may purchase a shrink wrap version of the customized software at a retail outlet, the e-mail customization system may transmit the customized software as an e-mail attachment, or the user may wait for the customized software to be completed and download the software immediately.

Payment Process

Figure 6E:
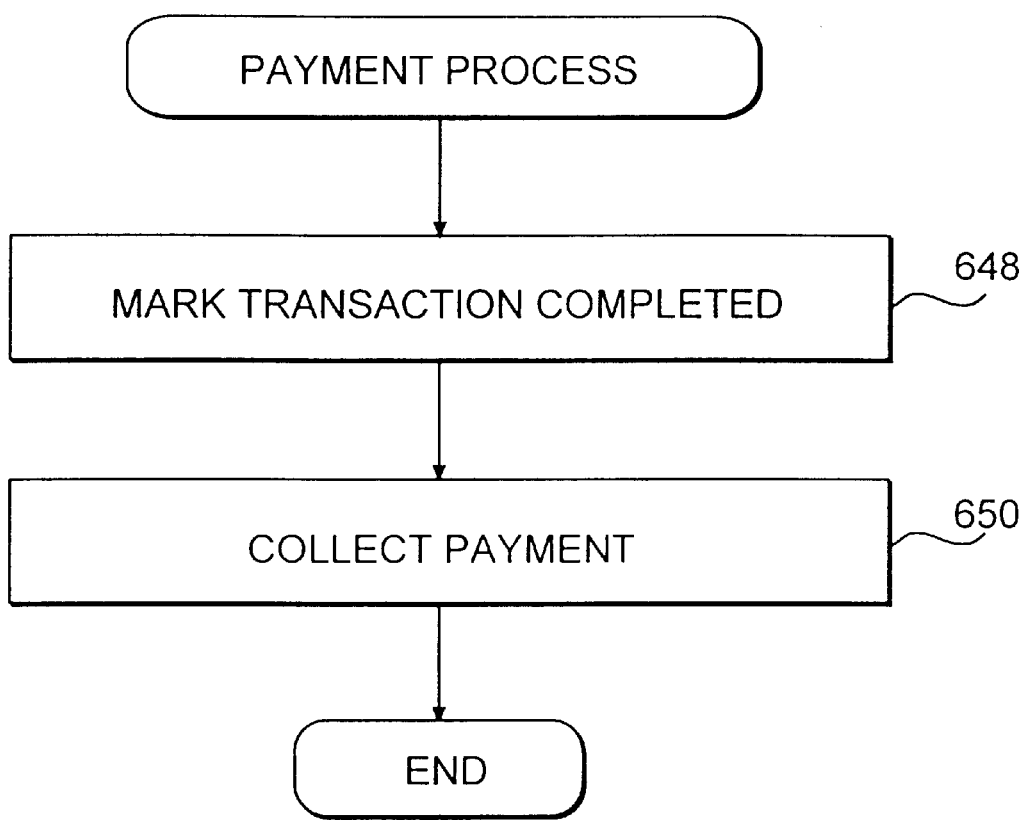
FIG. 6E depicts a more detailed flow chart of the payment process depicted in FIG. 5.

As shown in FIG. 6E, once the customized software package has been successfully delivered to the user, the payment process 510 begins, and the payment may be collected from the user's credit card. The transaction is marked completed in the OrderStatus table 462 by changing a boolean field to "yes"(step 648). At a regular interval, the e-mail customization system scans the OrderStatus table 462 and flags each user who had their customized software packages successfully delivered (step 650). The e-mail customization then charges each user's credit card.

Installation Process

Figure 6F:
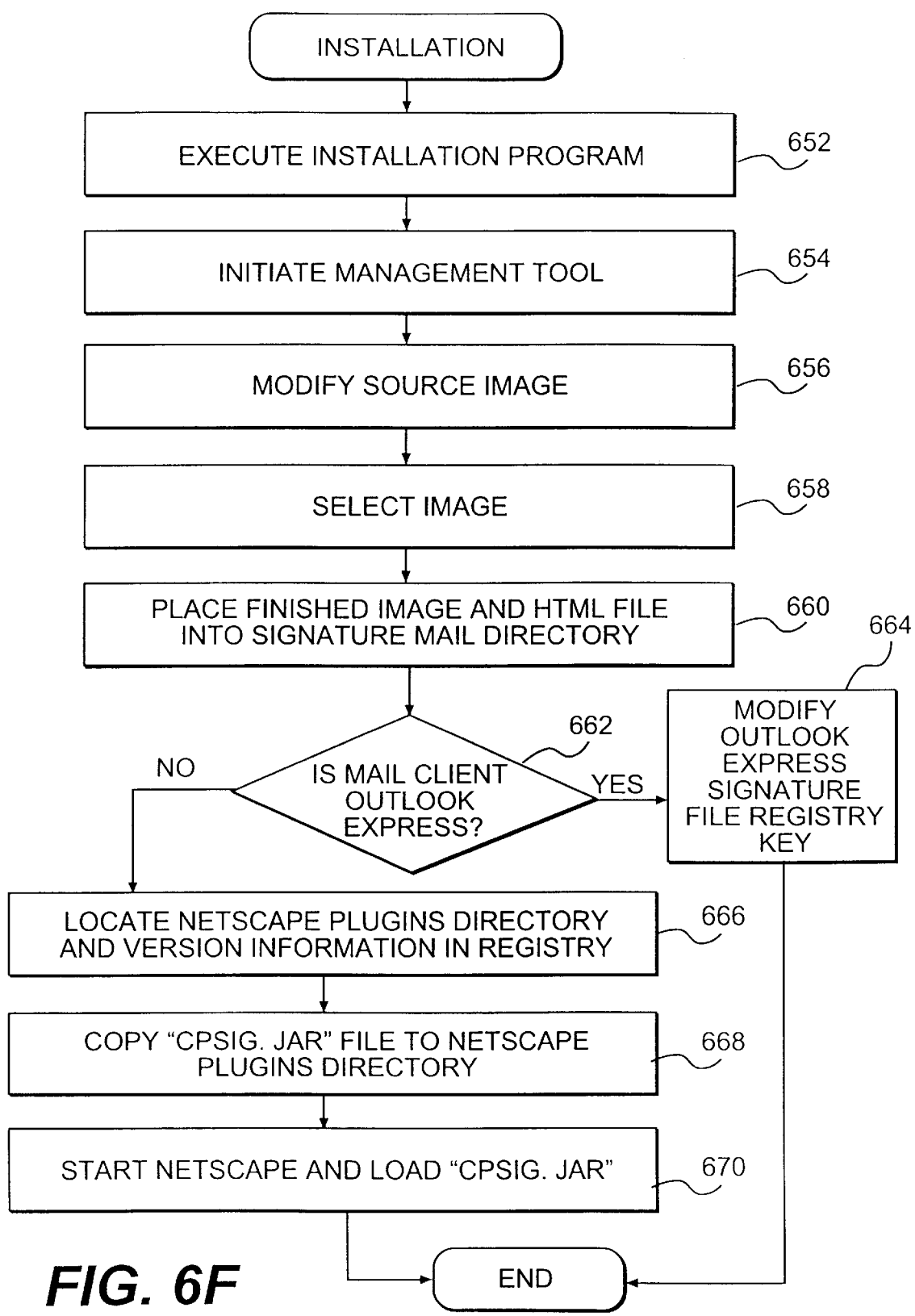
FIG. 6F depicts a more detailed flow chart of the installation process depicted in FIG. 5.
Figure 7C:
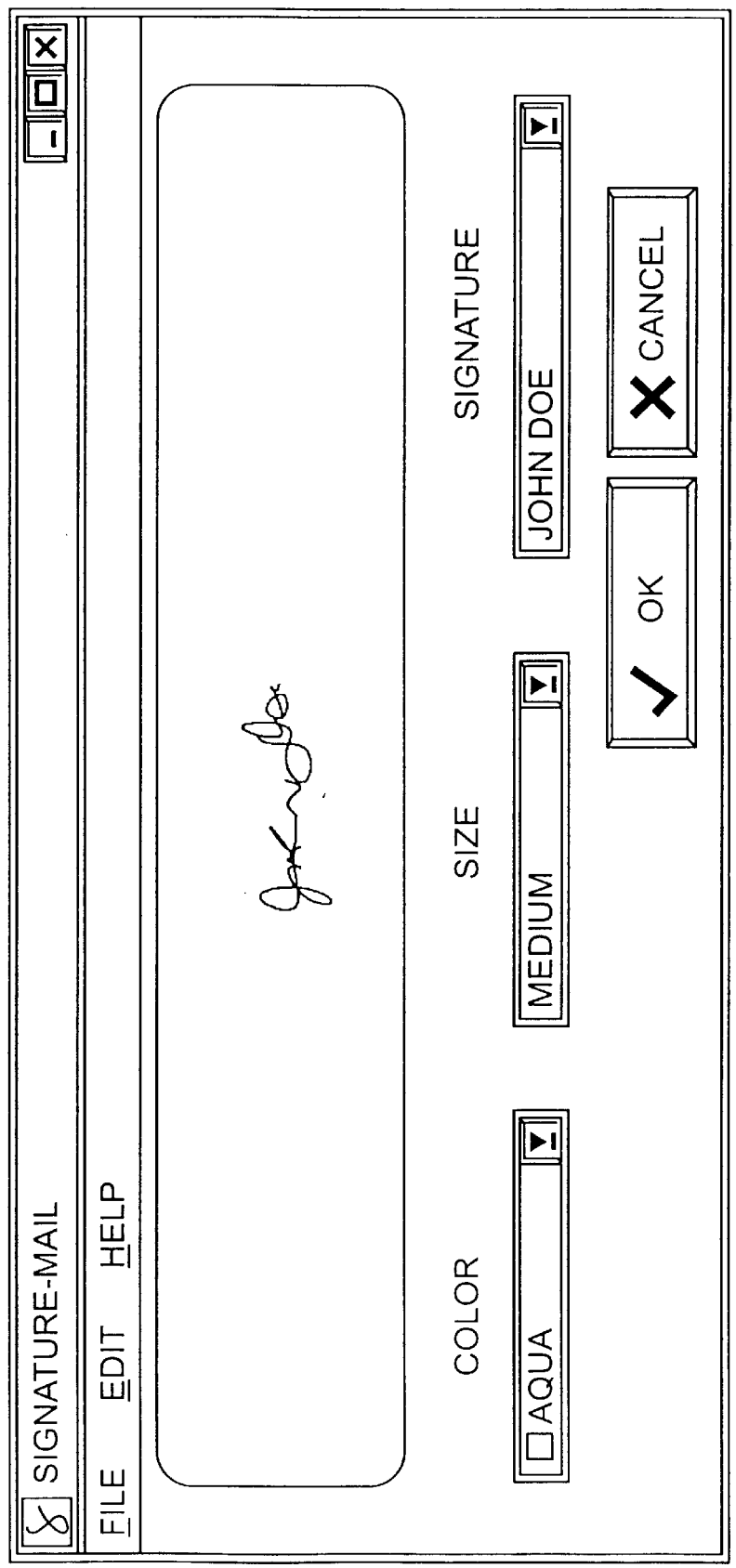
FIG. 7C depicts a more detailed diagram of the management tool program depicted in FIG. 3.

As shown in FIG. 6F, once the user obtains the customized software, the user executes the installation program bundled in the customized software on client computer 212 for installation of the customized software into an electronic mail client (step 652). The installation program automatically installs the customized software on the client computer by copying the images and secondary files to secondary storage device 340. Once the images are stored on the secondary storage device, they are referred to as source images, since these images are used as template images to create destination images for insertion into an e-mail message. The destination image includes the user selected attributes. After the installation of the customized software, the installer initiates management tool program 328 depicted in FIG. 7C (step 654). The management tool has a selection box offering a choice of images and a choice of size, color, and special effects. The management tool program also contains a clipboard feature. The clipboard feature allows an image to be included with an e-mail system that does not support integration with the customized software. The clipboard feature is further described below.

Once installed, the user may initially select a desired image, color, or size. The first time management tool program 328 is started, the management tool program loads a source image from secondary storage device 340, crops, scales and colors the source image using default settings, and saves it as a destination image into a persistent cache area with a transparent background (step 656). The cropping method is a specialized cropping method that removes any additional white space around the desired image. The cropping method locates the coordinates of the desired image within the source image by first searching for non white pixels on the interior of the source image. Once the largest non white pixel area is located, the cropping method expands the cropped area by five pixels in every direction. The expansion is done to ensure that an image close to, or outside, the source image border will not be discarded, and will be successfully cropped from the source image. The transparent background allows the image to appear as if it were written on the screen, regardless of the background color of the window. For example, the alpha component of an image's background color would be set to zero. The alpha component is analogous to opacity, and setting the alpha component of a certain color to zero makes that background transparent. Depending on the image format, different terms describe the transparency of an image, including alpha component and opacity. Different image formats can also be used, such as GIFs, JPEGs, animated GIFs, and Java applets. The image format is the syntax in which the graphic data that represents the image is held. System software displays the graphic data based on its interpretation of the image format.

At this point, the user may select an image, and attributes such as the size, and the color to use in an e-mail message using the selection boxes (step 658). Once the user selects the image and image attributes, management tool program 328 uses a decimation scaling technique in order to change the size of the image to the size requested in size field 722. This technique averages the RGB color values of all the pixels in an "n by n" sized areas tiled across the image creating a new single pixel representation of each "n by n" area defined within the source image. The resultant pixels are placed in a new image file, and the dimensions are equal to the source images width divided by n and the height divided by n. By limiting the n to an integer value, calculations are limited to integer values, thus speeding up the scaling process. However, this leaves a smaller set of scaling factors. Therefore the user may select as a size, from extra small, small, medium, large, and extra large. Mapping the color indicated in the color selection box, may be accomplished by using a logical OR of the source image's pixel data and the selected color. This retains the aliasing of the image while changing its hue. Finally, the new image is saved persistently, so that when the same combination of color, size and image is chosen, it may be computed much quicker. A persistent storage area is an area that remains intact when the power to a device is turned off, for example a hard drive. The user may press the "OK" button to signify the correct selection of the appearance of the image, and once pressed, the selected image is saved as a new transparent GIF image, and an HTML file is created (step 660). The HTML file is a text file that contains a link to the image and the alternate text for the image. For example, the HTML file may contain:

<HTML>
<IMG SRC="file:///C:\Program Files\Internet Software\Signature-Mail\Cache\090101.GIF" ALT="John Doe" BORDER=0>
</HTML>

Next, the installation program registers the management tool with all web browsers located on the client computer as the default helper application for all "application/sigmail" file types. The "application/sigmail" file type is a specific MIME type stored in the well-known Windows INI format. For example, the "application/sigmail" file type may contain:

Content-type: application/sigmail
[Signature-mail]
URL=http://www.greetingcard.com/cgi-bin/rx_signature.cgi
Username=UUUUUU
Password=PPPPPP
Expiration=YYYY MM DD
LicenseKey=XXXXXXXXXXXXXX One skilled in the art will appreciate that other file formats may be used to store the "application/sigmail" file type. Further, a helper application is a well-known program used to open files not natively recognized by a web browser. For example, Adobe Acrobat is the default helper application for the PDF file format.

At this point, to finish the installation process, the installation program must determine which e-mail client is installed on client computer 212 so that the user may select an image to insert from within the e-mail system (step 662). The installation program may determine the e-mail system by referencing a particular field in the registry file. For example, if the installation program determines that the e-mail system is Outlook Express, the Outlook Express signature file registry key, located in the Windows registry file, is modified to point to the fully qualified filename of the HTML file (step 664). The Windows registry file is a resource database used to store information necessary to configure the computer containing registry keys. Each key defines one piece of information about the computer. By editing the Outlook Express signature file registry key, the HTML file may be inserted into Outlook Express.

In order to install the customized software into Netscape Communicator's e-mail system, the installation program determines Communicator's Plugins directory and the version of Communicator by accessing the Windows registry key corresponding to those parameters (step 666). After this, the file "cpsig.jar" is placed into the Netscape Communicator Plugins directory (step 668). By placing the "cpsig.jar" file into the Plugins directory, each time Communicator starts, the file is loaded as well (step 670). The "cpsig.jar" file adds a feature to the menu structure of Netscape Communicator for insertion of an image into an e-mail message. One skilled in the art will appreciate that management tool 328 may interface with many other types of e-mail clients and allow for the personalization of e-mail messages.

Pre Printed Forms

Figure 6G:
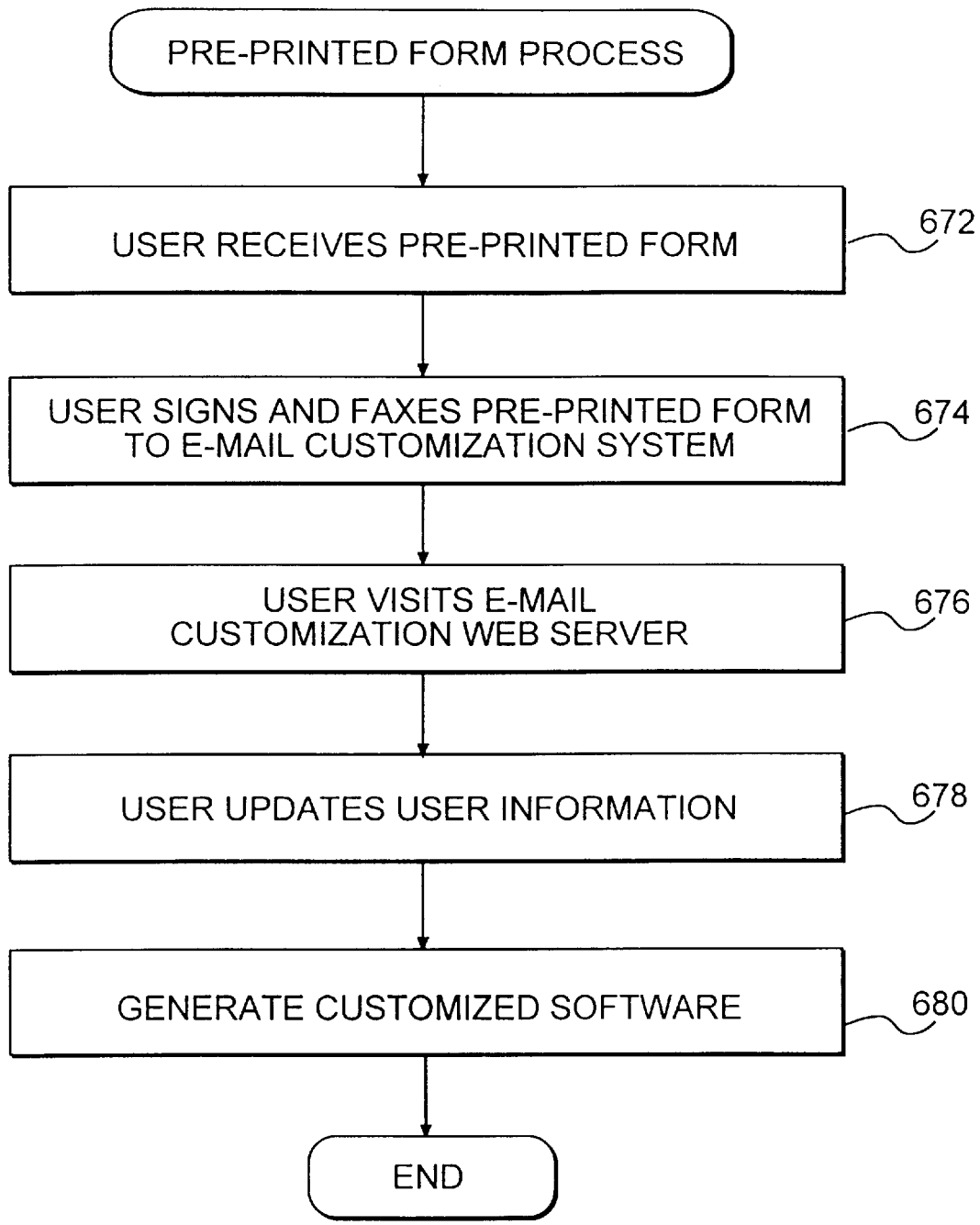
FIG. 6G depicts a flow chart of the pre-printed form processes.
Figure 7D:
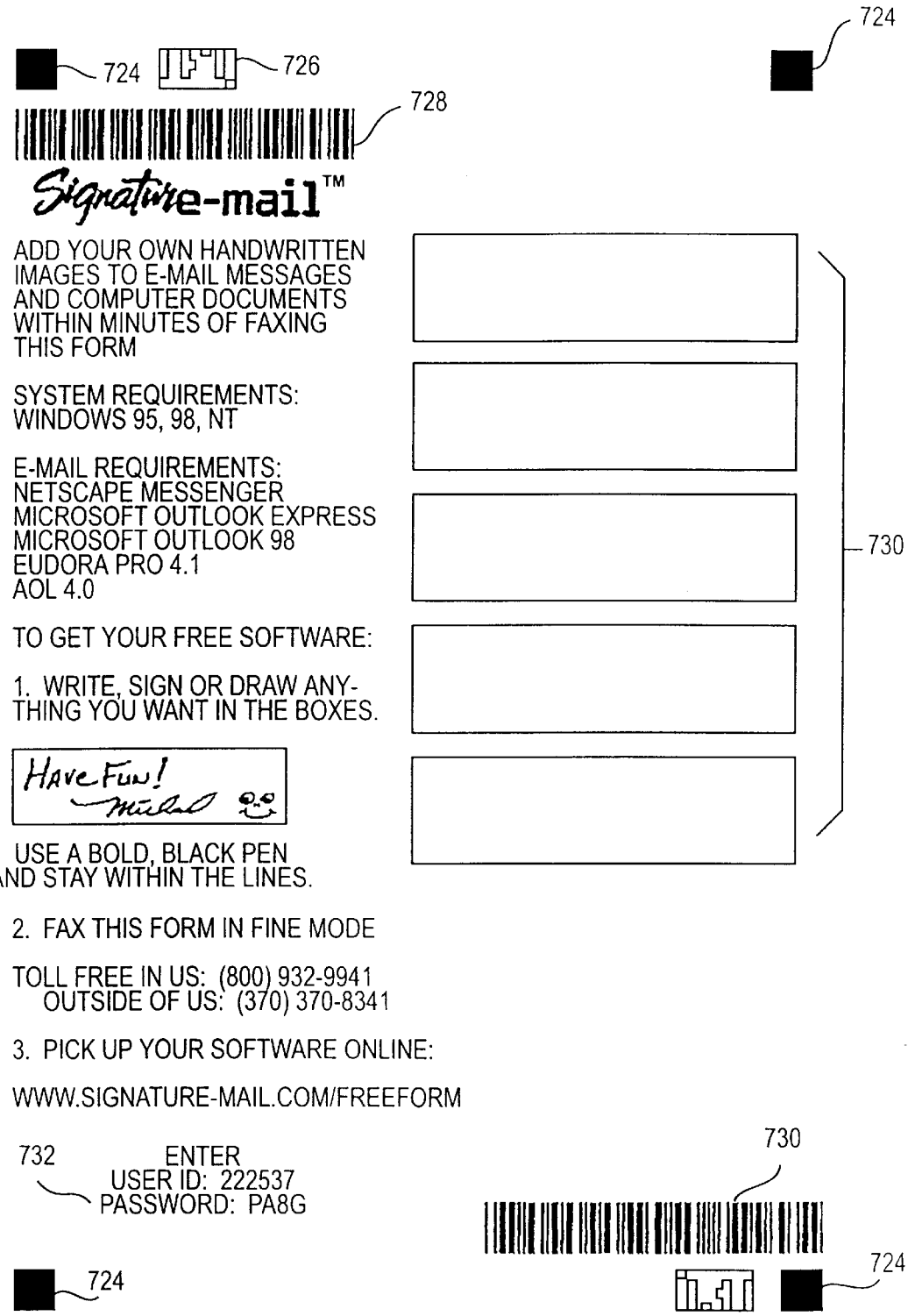
FIG. 7D depicts a pre-printed form in accordance with methods and systems consistent with the present invention.

In addition to printing a form and faxing it into the e-mail customization system, a pre-printed form may be used. As shown in FIG. 7D, the pre-printed signature form is similarly configured as the signature form depicted in FIG. 7B. The pre-printed signature form additionally contains temporary user information 732 that is different for each pre-printed signature form. As shown in FIG. 6G, pre-printed form process is initiated, for example, by a user receiving a pre-printed form (step 672). The user may receive the form in a number of different ways. For example, the user may receive the pre-printed signature form with a new computer or the user may print the pre-printed signature form with form creation software 330. Form creation software 330 contains as program resources, a form template in bitmap format, a unique temporary customer ID and password, and the placement coordinates of the customer ID, password, and barcodes.

When initially compiled, form creation software 330 stores the customer ID and password as strings with values of "userid" and "pass." However, before the user receives a copy of form creation software 330, the customer ID and password must be replaced with unique temporary strings. Each time a user requests a copy of form creation software 330, the e-mail customization system replaces the customer ID and password strings with a unique temporary customer ID and password. Since these strings appear once in the binary code of the compiled form creation software 330, e-mail customization system 220 may simply perform a text search and replace the strings in a mechanical fashion. For example, a search and replace statement part of the the well-known PERL programming language may be used. In doing so, each user requesting a copy of form creation software 330 will receive a unique copy. Also, when form creation software is requested, the e-mail customization system adds a record to PrePrinted ID table 472 that includes the unique user ID and password, and the location from where the user requested a copy of form creation software 330. This way, e-mail customization system may maintain a list of outstanding forms and the requesting locations. For example, a record in PrePrinted ID table may include:

User ID:ABCD;

Password:1234;

Location:http://www.beyond.com.

E-mail customization system may receive the requesting location field from, for example, by the well known "Referred By" field in the HTTP protocol suite. One skilled in the art will appreciate that additional information may be included in the PrePrinted ID table, such as date of creation, or the total number of forms requested from a particular location.

When form creation software 330 prints the signature form, it creates a composite of an included signature form template and temporary customer ID and password 732. Form creation software 330 also creates barcodes 728 and 730 using the temporary customer ID. One skilled in the art will appreciate that the user may obtain a unique copy of form creation software 330 from a number of locations, such as Internet software repositories or as an e-mail attachment.

Once the user receives the pre-printed signature form, regardless of the method used, the user signs and transmits the form to e-mail customization system 220 (step 676). Similar to the collection process described above, after the user transmits a completed signature form to fax server 224 at e-mail customization system 220, the collection process begins and decodes and stores the image and the temporary user identification in PrePrinted Temp table 470. PrePrinted Temp table 470 stores this information until the user views a web page from the e-mail customization system and updates their personal information.

At this point, the user may access web server 222 at e-mail customization system 220 (step 678). The user may access the web server by entering in temporary user information 732 located on the pre-printed signature form. Once accessed, web server 222 transmits an HTML web page to client computer 212. The web page may include an electronic pre-printed order form for the user to fill out, as shown in FIG. 7E. The pre-printed order form permits the user to update their various information in PrePrinted Temp table 470. The pre-printed order form also contains image 736. Image 736 is a digitized version of image area 730 that was received by fax server 224. One skilled in the art will appreciate that although one image is shown on the pre-printed order form, the order form may contain additional images representative of image area 730. Once the pre-printed order form is displayed on browser 326, the user can update various information into the pre-printed order form (step 680). Similar to the electronic order form depicted in FIG. 7A, the pre-printed order form includes alternate text information 734 and personal information 738.

When finished, the user selects Generate button 740, and in response, the alternate text information and personal information 738 are transferred to CustomerInformation table 460, as described above with reference to order process 502 (step 682). Also, the images are stored in Signature table 468. Once all the information is stored, a complete record is placed in Sigmatic Queue table 466 as a ready record and the email customization system generates customized software as described above, with reference to customized software creation process 506.

Customized Software Usage

Figure 8:
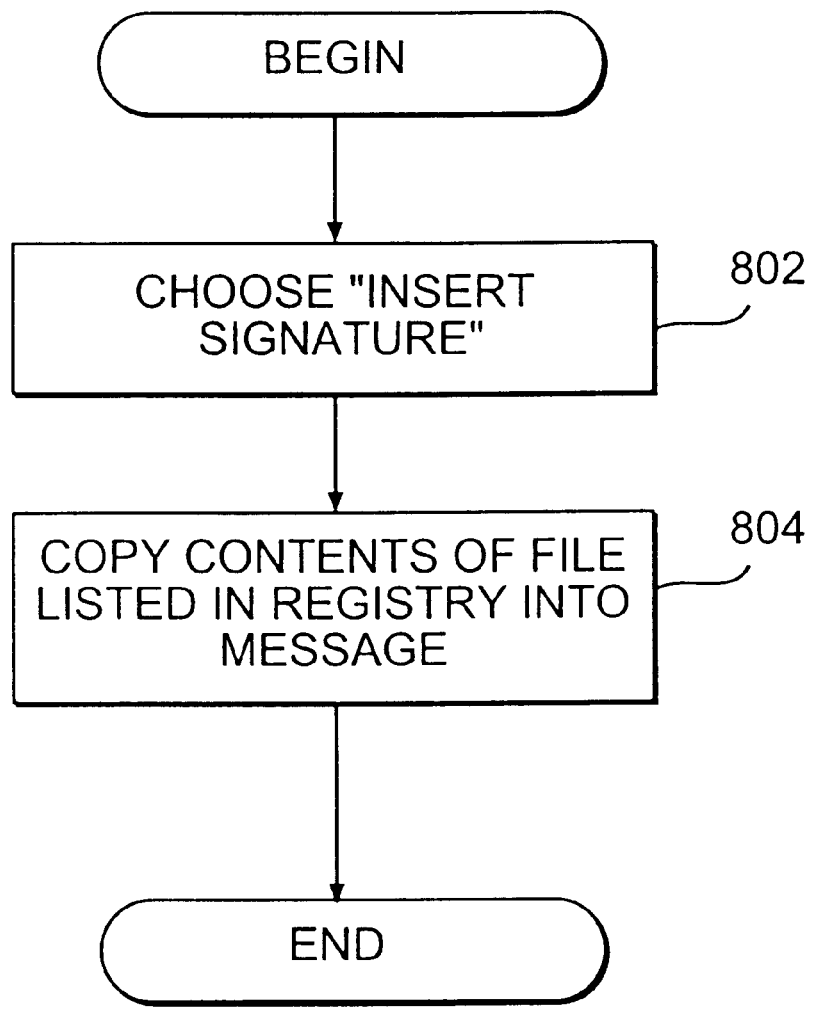
FIG. 8 depicts a flow chart of the steps performed by the user when inserting an image into Microsoft Outlook.

Once the customized software is installed in the appropriate e-mail client, the customized software may be executed. For example, as shown in FIG. 8, a user inserts an image into a mail message in Outlook Express by selecting "Insert Signature" from the tools menu in Outlook Express or by pressing the "Insert Signature" icon located on the Outlook Express tool bar (step 802). This causes the HTML file containing the image link and alternate text to be inserted into the current e-mail message, by accessing the Windows registry key for the correct location of the HTML file (step 804).

Figure 9:
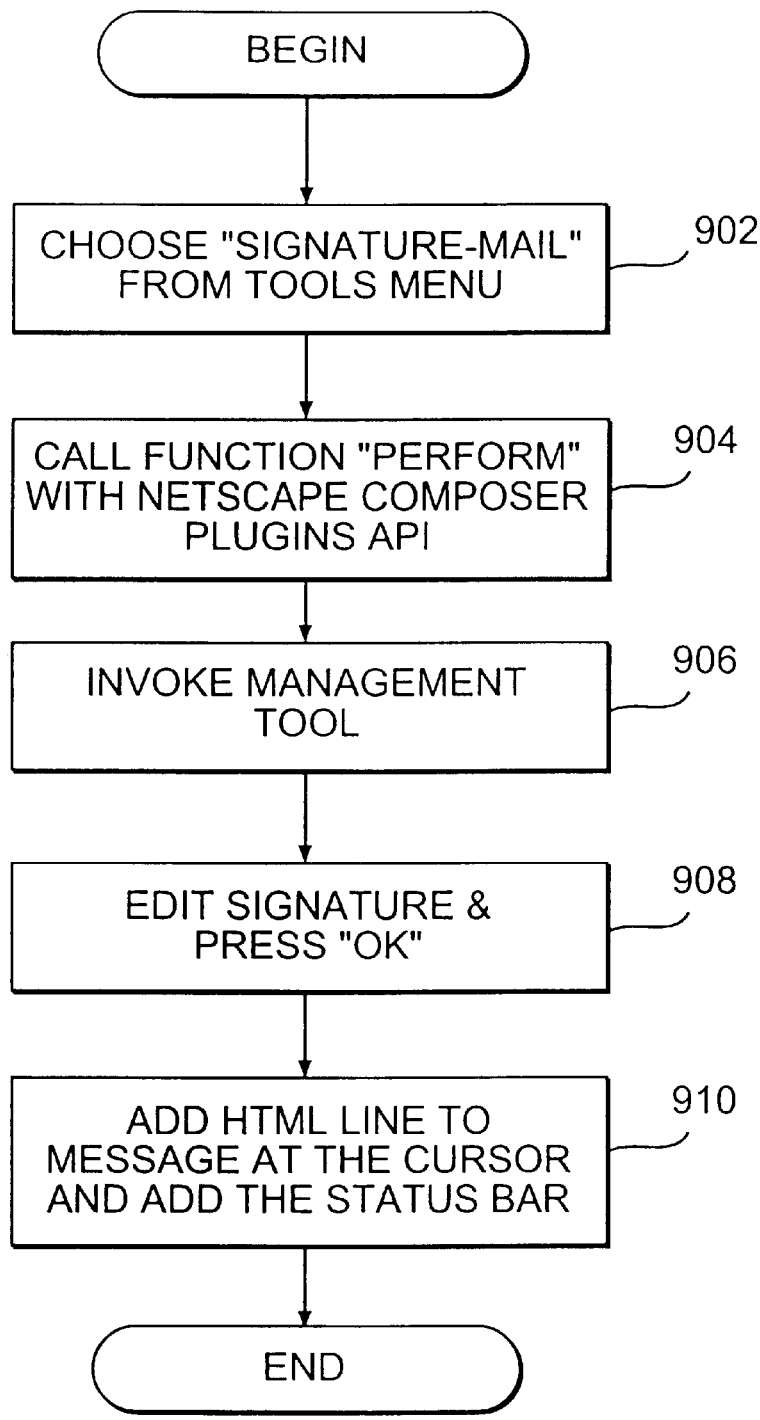
FIG. 9 depicts a flow chart of the steps performed by the user when inserting an image into Netscape Communicator.

In an alternate configuration, show in FIG. 9, the customized software installation updates the tools menu of Netscape Communicator, and when the user selects "Signature mail" from the tools menu (step 902), a "perform" function of the Netscape Composer Plugin API (step 904) causes Netscape Communicator to start management tool program 328 (step 906). The user then edits and selects an image with the desired attributes (step 908). After the user selects the image and presses "OK," the HTML file is added to the e-mail message including the image location and the alternate text. Further, a status line is added to the Netscape Communicator Window (step 910). The status line may indicate that the e-mail message was modified with customization software, the alternate text, or a link to a web page at the e-mail customization system.

Figure 10:
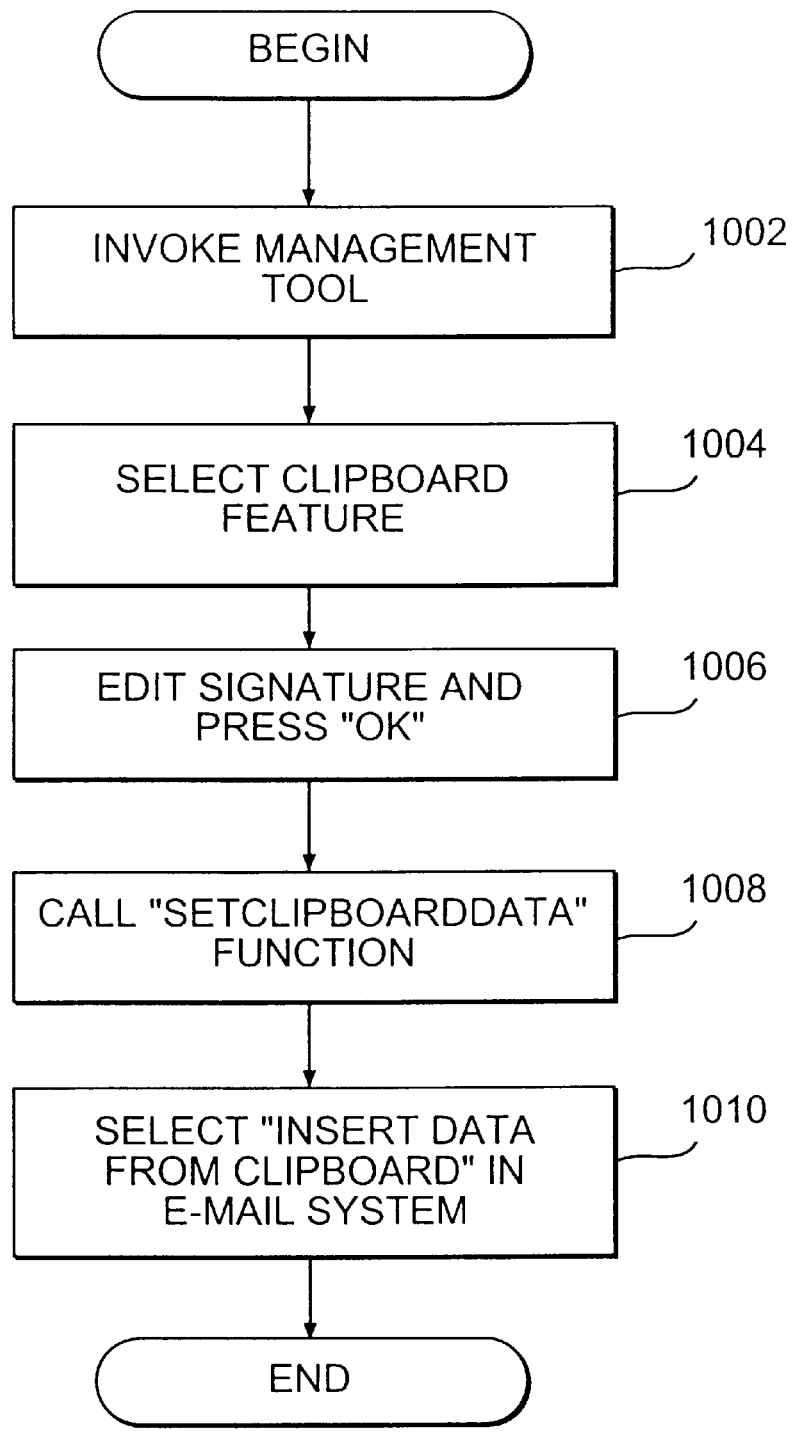
FIG. 10 depicts a flow chart of the steps performed by the user.when inserting an image using the clipboard method.

In yet another alternate configuration, shown in FIG. 10, the customized software is used in an HTML e-mail system that does not support complete integration of the customized software, such as the Eudora e-mail system available from Qualcomm of San Diego, Calif. This configuration uses the clipboard feature of management tool program 328. A user inserts an image into Eudora by first invoking the management tool program (step 1002). The user next selects the clipboard feature of management tool program (step 1004). The clipboard feature instructs management tool program 328 to save the image to a clipboard area instead of a GIF file. The clipboard area is a special memory area maintained by the operating system that allows data to be transferred from one program to another. Management tool program 328 uses a "SetClipboardData" function to place the image on the clipboard. The SetClipboardData function is part of the Microsoft Windows API. More information on the Windows API may be found at "http://leb.net/wine/WinDoc/msdn/sdk/platforms/doc/sdk/win32/func/src/."

Once the clipboard feature is selected, the user then edits and selects an image with the desired attributes and presses "OK" (step 1006). After the user selects the image, the management tool program calls the SetClipboardData function to copy the image to the clipboard area (step 1008). Finally, the user inserts the data from the clipboard into the e-mail system (step 1010). The e-mail system uses a "GetClipboardData" function to retrieve the data from the clipboard area to insert into the e-mail message. Similar to the SetClipBoardData function, the GetClipboardData function is also part of the Microsoft Windows API. Although only three e-mail systems are described, one skilled in the art will appreciate that similar usages of the customized software may be used in other e-mail systems.

Reception of E-mail

After completing the text portion of the e-mail message, the user may include an image, for example a signature, to a desired address. The inclusion of the image adds HTML formatting to the e-mail message and thus the e-mail message must be sent using the multipurpose Internet mail extension (MIME) protocol. The MIME protocol enables non-ASCII data to be transmitted with an e-mail message in its native format. For example, a MIME-compliant e-mail system can send and receive graphics, audio, and video files via the Internet. MIME-compliant e-mail systems use MIME types to determine the type of information being sent or received. A MIME type describes the contents of the file. For example, one MIME type is the "text/html" type. The "text/html" MIME type refers to a file that contains HTML formatting. All HTML-compatible e-mail systems send HTML formatted e-mail messages using the "text/html" MIME type. An e-mail system cannot correctly read and display "text/html" MIME types if it is not HTML-compatible. Non-HTML-compatible e-mail systems will generally only recognize "text/plain" or "text/rich" MIME types used in the e-mail message. The "text/plain" MIME type refers to the standard ASCII format, and the "text/rich" MIME type refers to a semi-formatted text file that does not include graphics. HTML-compatible e-mail systems also include a "text/plain" MIME type version of the message as well in case the recipient e-mail system cannot interpret the "text/html" MIME type.

Figure 11:
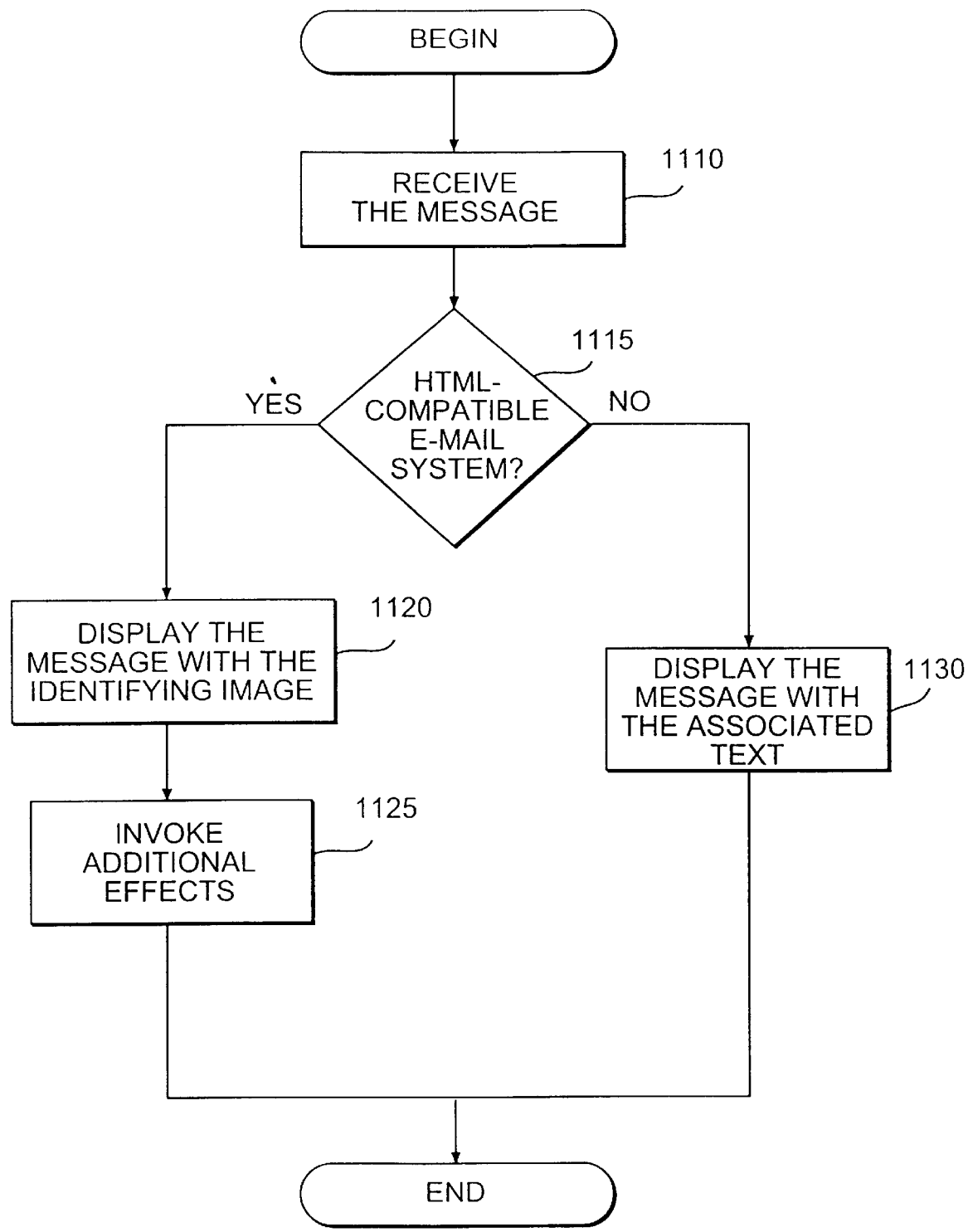
FIG. 11 depicts a flow chart of the steps performed when receiving an e-mail message.

FIG. 11 depicts a flow chart of the steps performed by a receiving e-mail system. The receiving e-mail system first receives the e-mail message in the "text/html" and the "text/plain" MIME types from a user at client site 210 (step 1110). Next, depending whether the receiving e-mail system is HTML-compatible will determine how, and if, the message is displayed (step 1115). For example, if the e-mail system is an HTML-compatible e-mail system, the e-mail system will display the "text/html" MIME type and the message will be displayed with the customized image in the message (step 1120). And when, for example, a cursor is placed over the customized image in the message, any effect included in the image, such as the alternate text, may be displayed or activated as further described below (step 1125). In particular, the alternate text may be displayed next to the mouse cursor, allowing illegible signatures or logos to be read with ease. For the purpose of advertising to those with HTML-compatible e-mail systems, a message can appear in the status bar informing potential customers of where this product can be obtained, also as further described below.

If, however, the e-mail system is not HTML-compatible, but is MIME compliant, the e-mail system will not display the "text/html" MIME type, and instead, will display the "text/plain" MIME type. This representation of the e-mail message displays the message with the alternate text in place of the image (step 1130).

Status Line

To have information included in the status line of the e-mail message, the e-mail message includes a body tag in the HTML formatted e-mail message, which describes the global settings in the message. Specifically, an onload instruction is included in the body tag. The onload instruction is a feature of the well known JavaScript scripting language, from Netscape. The onload instruction is set to equal "return window.defaultstatus," which in turn is set to equal the text a user desires to include in the status bar. For example, the HTML code for the body tag may look like the following: <body onload="return window.defaultstatus='Text to be placed in status bar'">. The body tag for including the text in the status bar must be included in the HTML code before an endbody tag for the message.

Another feature when including text in the status bar is the capability of including uniform resource locators (URLs) in the text. A URL is an address for a resource on the Web. After a user has composed the text placed in the onload instruction of the body tag, the e-mail system checks to see if the tag includes a URL. If a URL is found, the customized software creates a link in the body of the message to the URL of the text displayed in the status bar. The customized software uses the "<A HREF>" HTML tag to create the link. The user may activate the link by clicking on the linked element. Consequently, when the text is displayed with a URL in the status bar, a user viewing the message could go to the URL by clicking the link.

Figure 12:
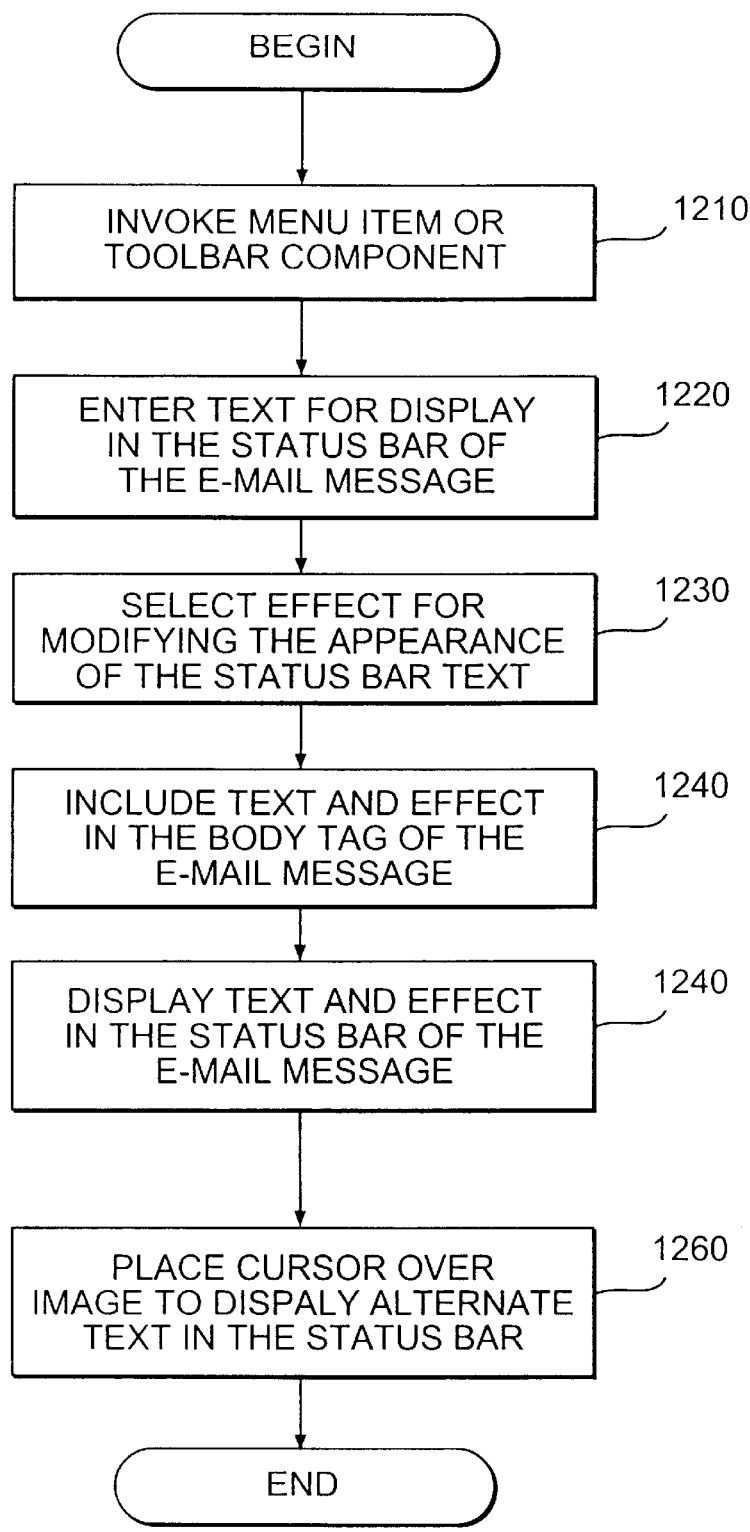
FIG. 12 depicts a flow chart of the steps performed when including text in the status bar of an e-mail message.

FIG. 12 depicts a flowchart of the steps performed when including text in the status line of an e-mail message. To add the text, a user may, for example, invoke a menu item or a toolbar component within the e-mail system (step 1210). This invocation opens up a window similar to the selection box described above with respect to inserting an image. The window prompts the user to enter the desired text for display in the status bar of the e-mail message (step 1220). In addition, a user may select a variety of special effects for modifying the appearance of the text in the status bar (step 1230). The effects include, for example, scrolling, blinking, or animated scrolling of the text in the status bar. Upon some type of acknowledgment, such as clicking an "OK" icon, the chosen text and effect are included in the body tag to enable the display of the text and effect in the status bar of the e-mail message (step 1240).

The status bar text function automatically displays the entered text and any effect selected by the user when the e-mail message is opened (step 1250). However, in addition to showing the text and effect while the e-mail message is opened, the procedure or application can also include a function for displaying the alternate text of an identification object in the status bar (step 1260). In particular, a user can invoke the display of the alternate text in the status bar, for example, by placing the cursor of a pointing device, such as a mouse, over the identifying image in the e-mail message.

To have the alternate text displayed in the status bar in response to placing a pointing device cursor over the identifying image, an "onmouseover" is added to the <BODY> tag. The onmouseover instruction is part of the well known JavaScript scripting language. The onmouseover instruction is set in the same manner as the onload instruction described above, but is included in the href tag of the identification object instead of the body tag of the HTML code. For example, the onmouseover instruction may look as follows: <onmouseover="return window.status='alternate text'">. The setting of the onmouseover instruction can be performed automatically when the image is created. In addition, for e-mail systems that use images and the management tool program, the management tool program could place the alternate text in both the onmouseover instruction and in the no-script tag. When the alternate text is displayed in response to the placement of the mouse cursor, any information in the status bar, such as the text of the status bar text function, is replaced by the display of the alternate text. One skilled in the art will appreciate that the status bar functions may be used to display information, such as an advertisement of where the e-mail customization system can be purchased.

Client Computer Image Inputs

Figure 13:
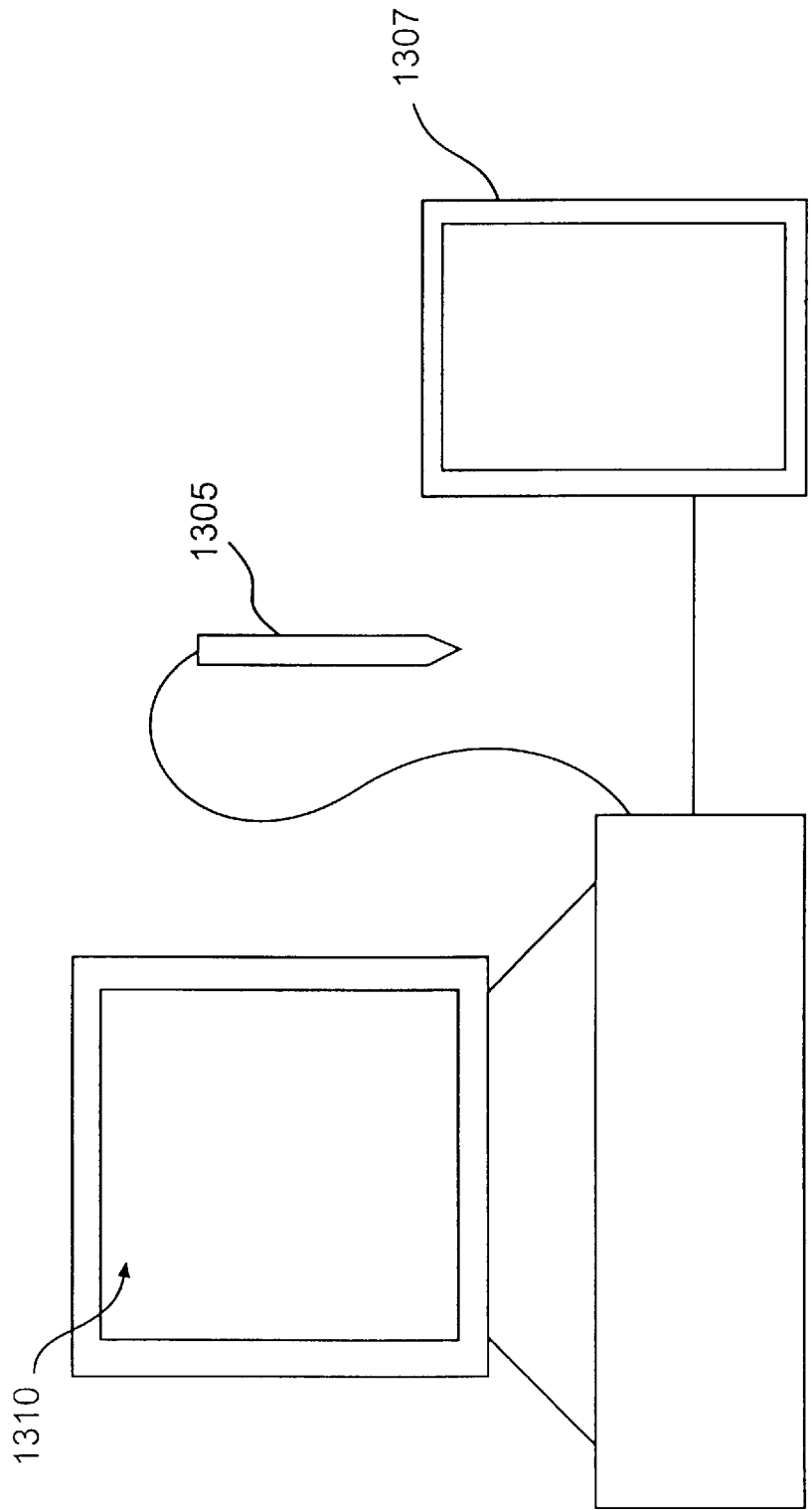
FIG. 13 depicts an alternative embodiment of the present invention that utilizes a pointing device.

FIG. 13 depicts an alternative embodiment of the present invention for making images available for insertion into e-mail messages on client computer 1300. Client computer 1300 is similarly configured to client computer 212, including a video display 1310, and additionally includes a pointing device 1305 and a drawing tablet 1307. The user operates pointing device 1305 to input an image instead of using the e-mail customization system to extract an image from a signature form. The client computer acquires the images and transmits them to the e-mail customization system for further processing. In this client/server architecture, a user operates the pointing device to input the desired image in conjunction with drawing tablet 1307 and video display 1310. Pointing device 1305 can be any available type including a touch pen with a tablet or screen sensor, a mouse, a track ball, a touch pad, a touch screen, and a eraser-head type device. Video display 1310 allows users to reject the inputted image and to reinsert a new image until a desired image is obtained. One skilled in the art will appreciate that other systems are available for making images available for insertion instead of a pointing device. For example, a scanning device or a fax modem device may be used to acquire images. More information on communicating with scanning devices, or other image acquisition devices may be found at "http://www.twain.org."

Figure 14:
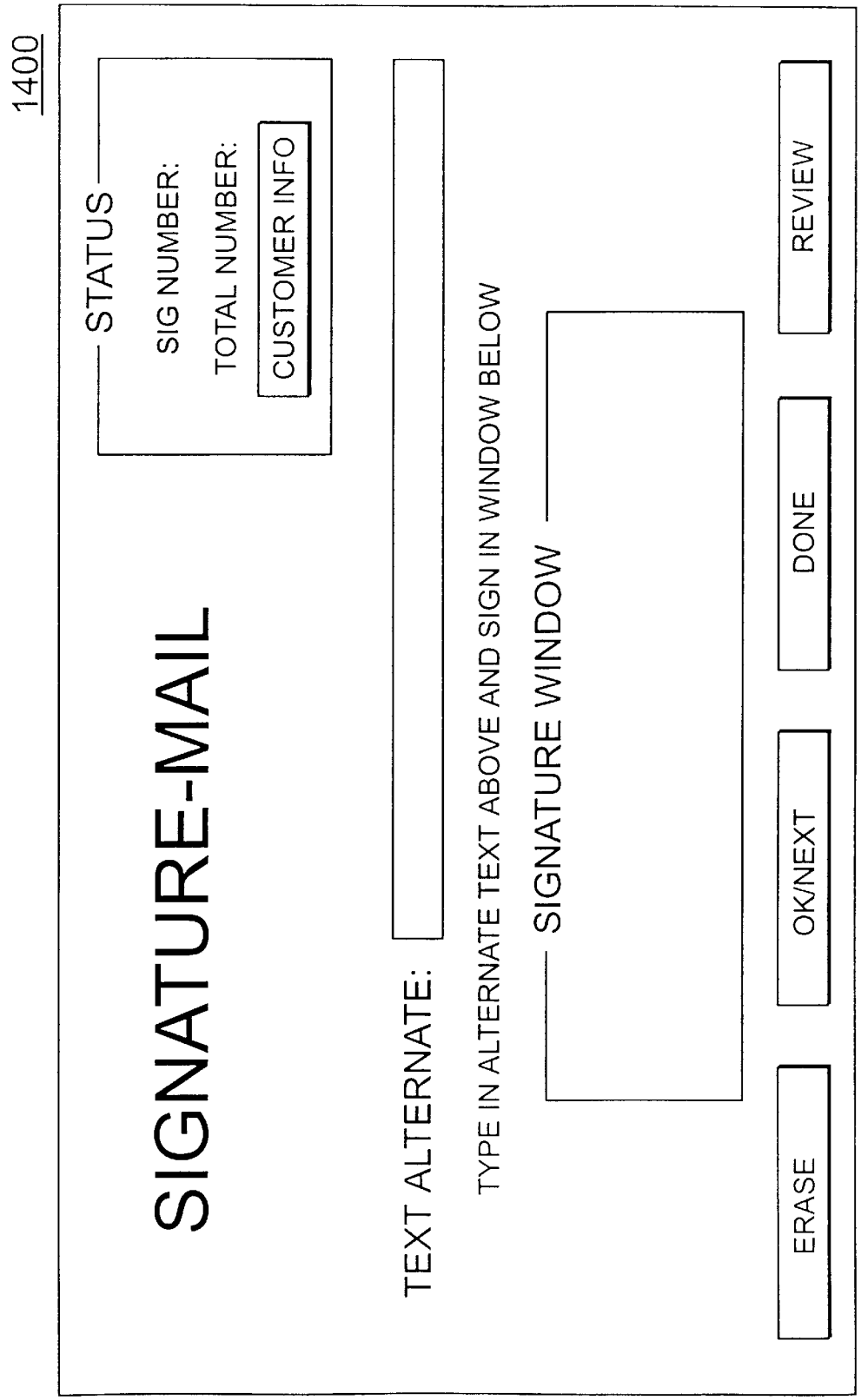
FIG. 14 depicts a diagram of a user interface on the video display depicted in FIG. 13.

FIG. 14 shows a diagram of a user interface 1400 on video display 1310. In the interface, there is a signature window for entering a handwritten image with a pointing device. User interface 1400 also includes a text alternate box for entering an image with a pointing device. User interface 1400 also includes a status box, which provides status information to the user during the creation of the images. In particular, the sig number indicates the image on which the user is currently working. Once the user has completed entering each desired image, the user selects the done button to indicate to the device that he has finished entering the images. One skilled in the art will appreciate that interface screen 1310 may either be web-based or non-web based for acquiring information from the user and communicating with the e-mail customization system. An example of a web-based user interface may be a Java applet. A Java applet is a program that is run by a Java enabled application, such as a web browser.

Figure 15:
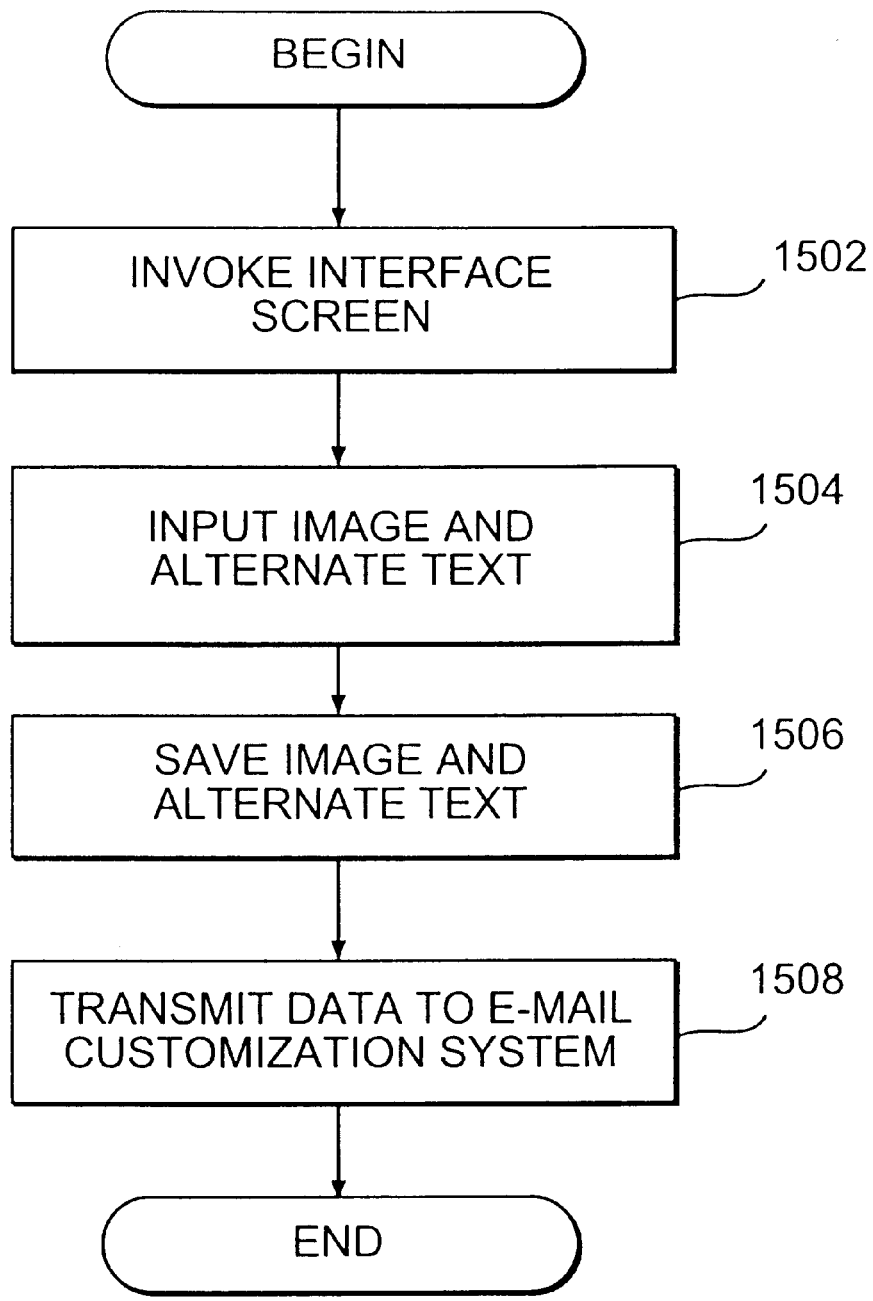
FIG. 15 depicts a flow chart of the steps performed by the user when using the user interface depicted in FIG. 14.

FIG. 15 depicts a flow chart of the steps performed when using user interface 1400 to input images into the e-mail customization system. To access user interface 1400, a user either downloads the user interface from a web site or selects a menu item already part of the e-mail system, as described below (step 1502). Once initialized, the user inputs the image using pointing device 1305 to draw the image in a box within the user interface (step 1504). The user also inputs the alternate text. The client computer takes the image input in the box and saves it in an image format, such as GIF, PNG or JPEG (step 1506). Finally, the image and alternate text are transmitted to the e-mail customization system (step 1508). The data may be transmitted to the e-mail customization system by the Internet. One skilled in the art will appreciate that the data may be transferred by other methods. For example, a secondary storage device, such as a floppy disk, may be mailed to the e-mail customization system. Whichever method used to transfer the data to the e-mail customization system, the e-mail customization system creates the customized software with the received images and alternate text, notifies the user upon completion, and delivers the customized software as described above.

Standalone E-mail Customization System

In addition to creating images on the client computer and transmitting them to the e-mail customization system, client computer 1300 may comprise a complete standalone implementation of the e-mail customization system and contain software that can acquire images and alternate text, and incorporate them into an e-mail system where all of the e-mail customization-related processing is performed on the client computer. To perform this functionality, the standalone implementation utilizes a standalone user interface.

Figure 16A:
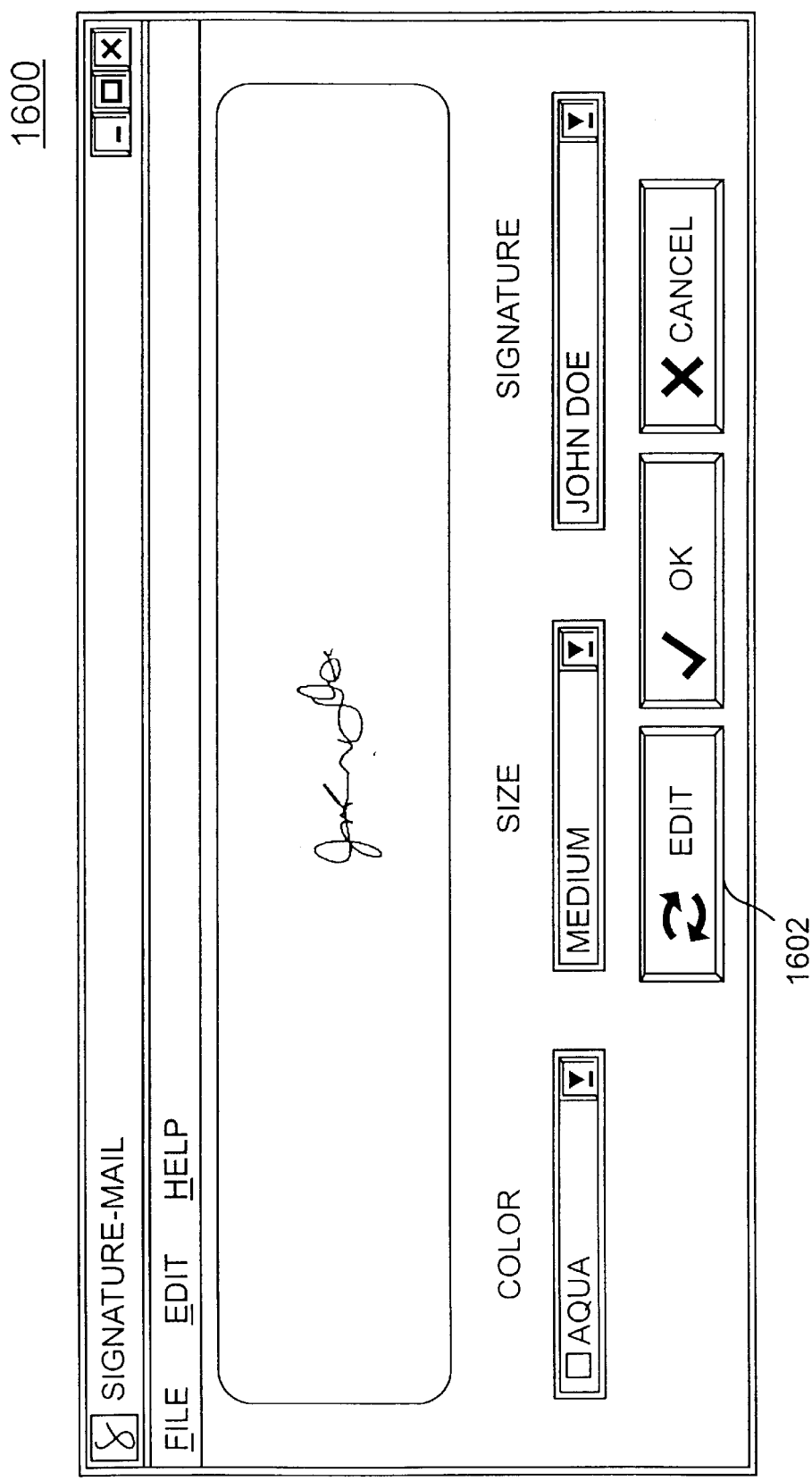
FIG. 16A depicts a diagram of the standalone interface on the video display depicted in FIG. 13.
Figure 16B:
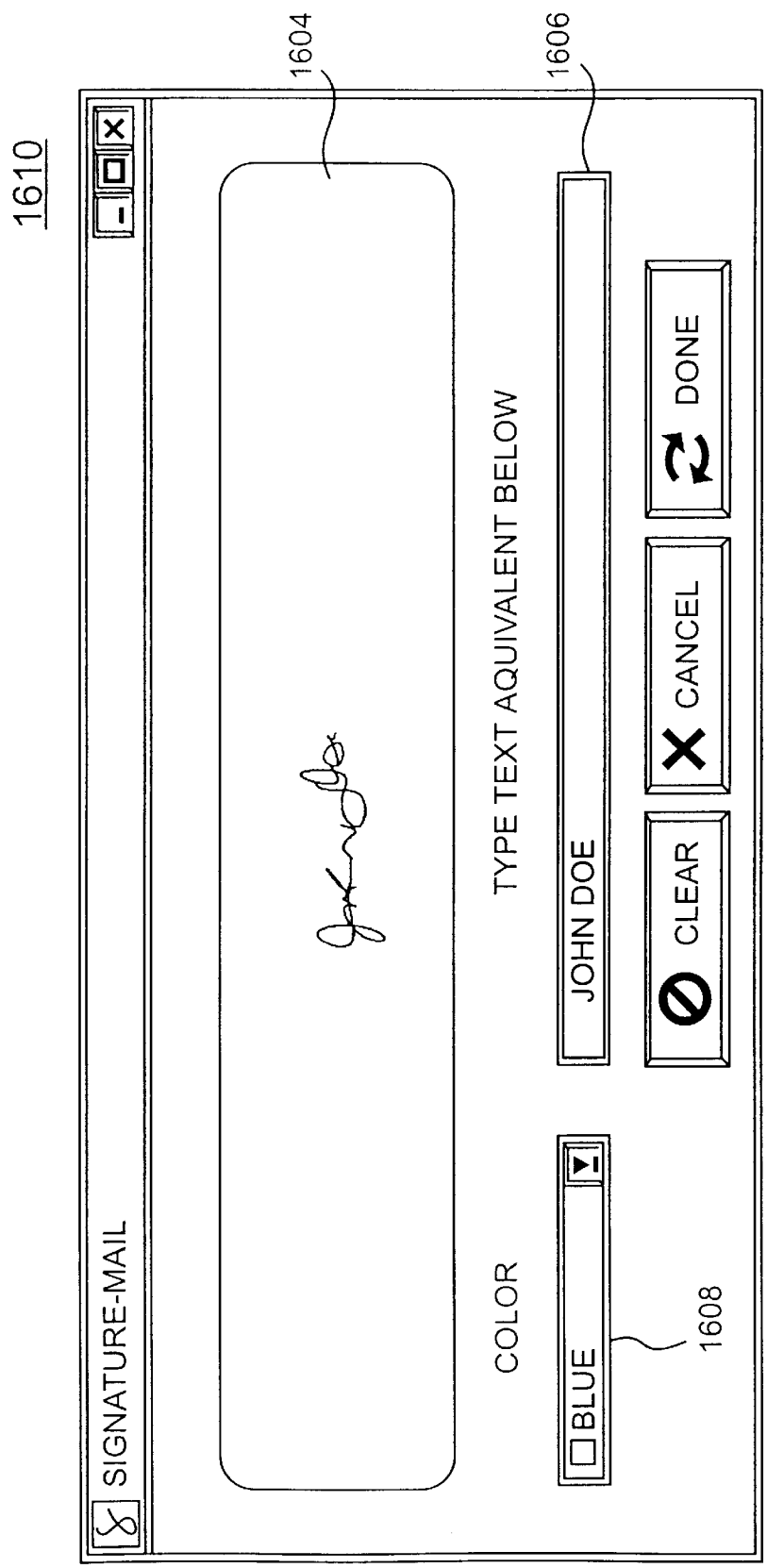
FIG. 16B depicts a diagram of the acquisition user interface on the video display depicted in FIG. 13.

FIG. 16A shows a diagram of the standalone user interface 1600. The standalone user interface 1600 is a modified version of management tool 328 as described above. The standalone user interface 1600 has the additional capability to acquire images by initiating an acquisition user interface. Acquisition user interface 1610, as depicted in FIG. 16B, is initiated when the user selects edit feature 1602 from the standalone user interface. The acquisition user interface 1610 is the user interface version of the signature form as described above. This user interface allows a user to create a desired image and alternate text without transferring data to the e-mail customization system. In this interface, there is a signature window 1604 for entering an image with a pointing device. The interface also includes a text alternate box 1606 for entering the alternate text version of the image entered in the signature window, and an attribute selection box 1608 that provides for the manipulation of attributes of the handwritten image. One skilled in the art will appreciate that these attributes may include size, shape, line style, or adding special effects like blinking. The acquisition user interface 1610 further includes a group of buttons below text alternate box 1606, which are used to generate each image. If the user creates an image in the signature window, but does not like the result, the user can select the clear button with the pointing device and re-enter a new image. One skilled in the art will appreciate that other systems are available for creating images in the signature window. For example, a scanning device or a fax modem device may be used to acquire images.

Figure 17:
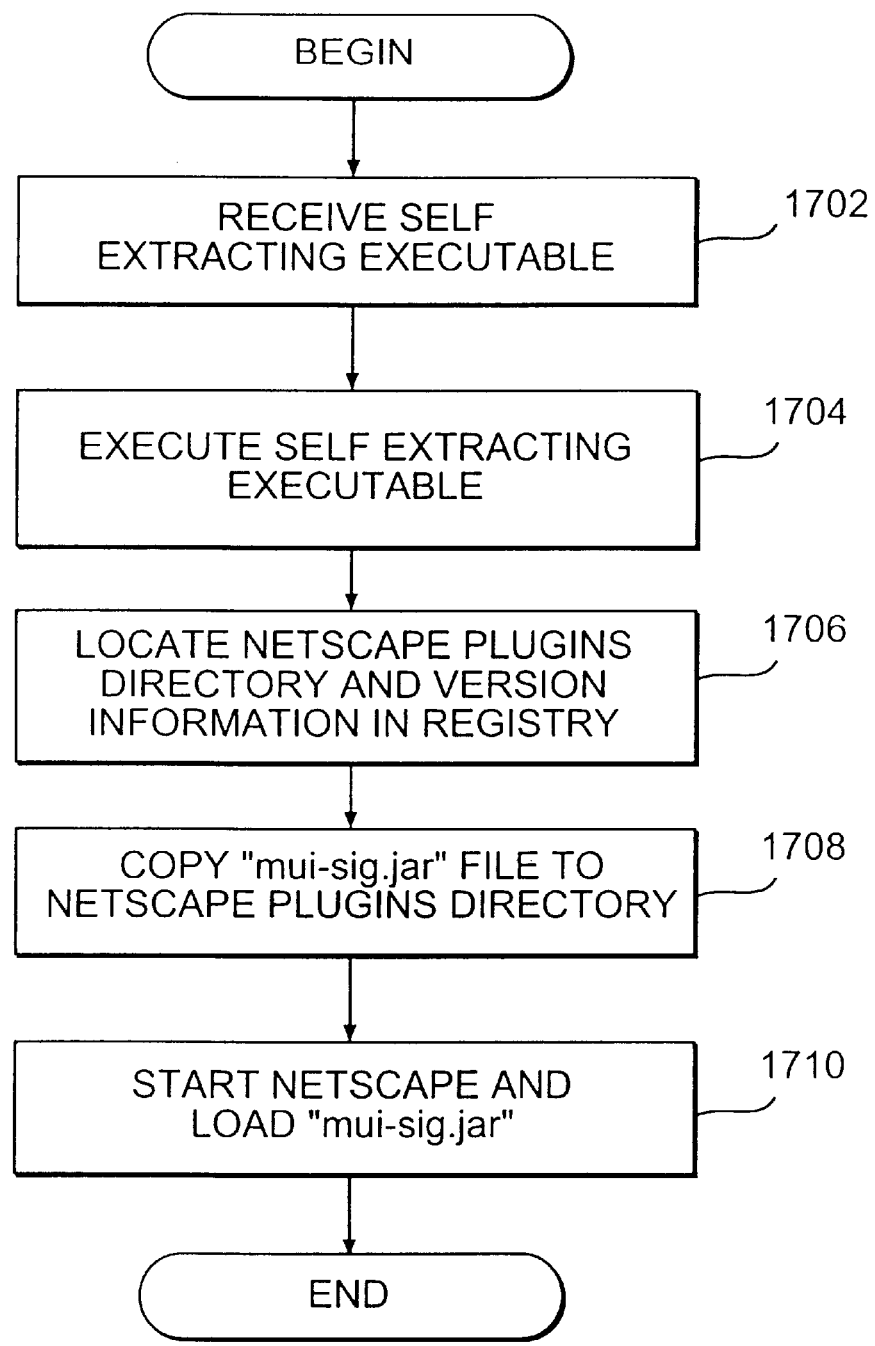
FIG. 17 depicts a flow chart of the installation process of the standalone e-mail customization system.

FIG. 17 depicts a flow chart of the installation process of the standalone e-mail customization system. The standalone user interface 1600 may be integrated with an e-mail system, such as Netscape Communicator. To integrate the standalone user interface 1600 with Netscape Communicator's e-mail system, a user receives a self extracting executable that includes the standalone user interface, and an installation program as described above (step 1702). The self extracting executable, as recognized by one skilled in the art, may be preinstalled, downloaded from the Internet, or received from a secondary storage device, such as a floppy disk. Once received, the user executes the installation program bundled in the self extracting executable on client computer 1300 for installation of the standalone user interface into an e-mail system (step 1704). Next, the installation program determines Communicator's Plugins directory and the version of Communicator by accessing the Windows registry key corresponding to those parameters (step 1706). After this, the file "mui-sig.jar" is placed into the Netscape Communicator Plugins directory (step 1708). Similar to the installation of the customized software as described above, by placing the "mui-sig.jar" file into the Plugins directory, each time Communicator starts, the file is loaded as well (step 1710). The "mui-sig.jar" file adds a feature to the menu structure of Netscape Communicator for the execution of the standalone user interface. One skilled in the art will appreciate that the standalone user interface may interface with many other types of e-mail systems, or come preinstalled with an e-mail system, and allow for the personalization of e-mail messages. For example, an e-mail system may include a library with subroutines to invoke the standalone user interface instead of loading the "mui-sig.jar" file. An e-mail system using the library may contain the standalone user interface already included. In this situation, the self-extracting executable would not be required.

Standalone E-Mail Customization Usage

Figure 18:
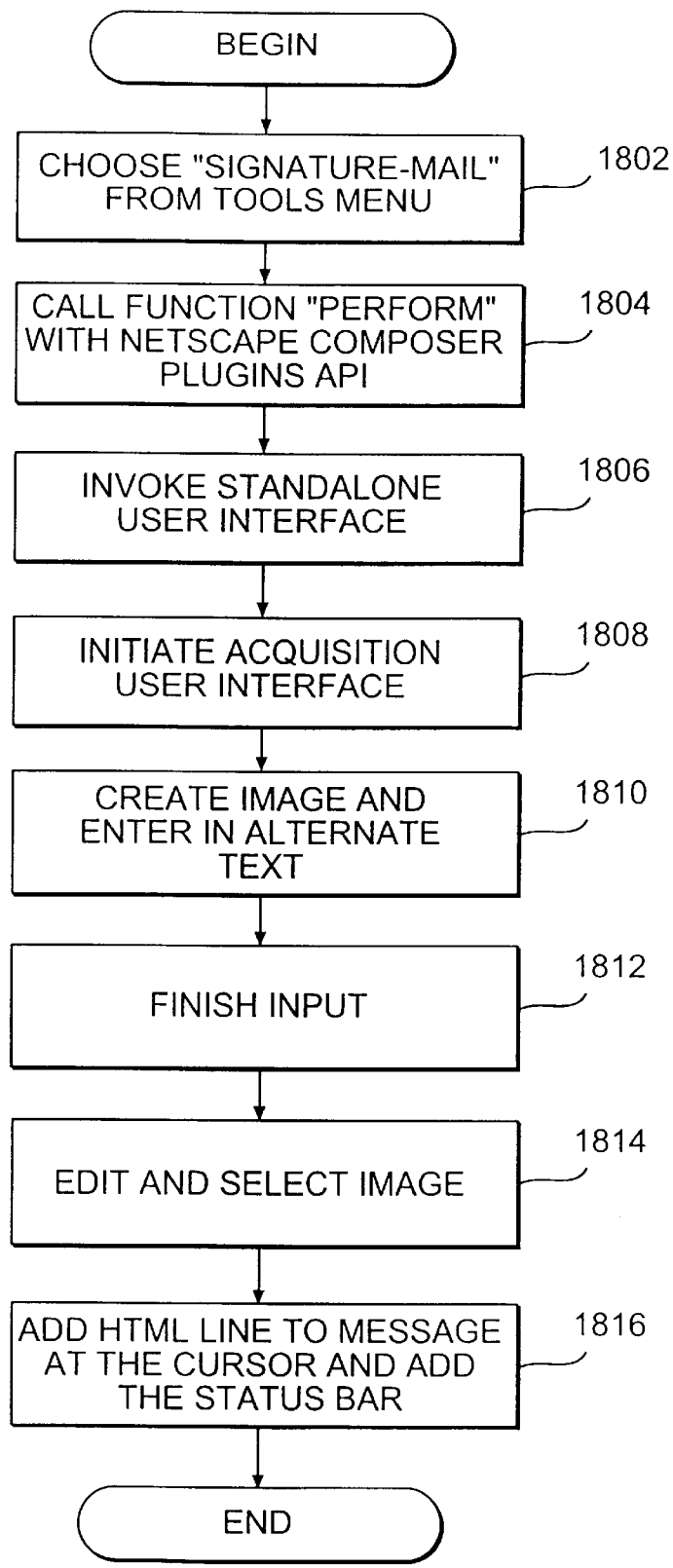
FIG. 18 depicts a flow chart of the steps performed by the user when using the standalone e-mail customization system.

Once the standalone user interface 1600 is installed in the e-mail system, the standalone user interface may be executed. For example, as shown in FIG. 18, the standalone user interface updates the tools menu of Netscape Communicator, and when the user selects "Signature mail" from the tools menu (step 1802), a "perform" function of the Netscape Composer Plugin API (step 1804) causes Netscape Communicator to start the standalone user interface (step 1806). When first initiated, the standalone user interface does not contain images. The user initially creates an image by initiating the acquisition user interface 1610 (step 1808). The user initiates the acquisition user interface by selecting the edit feature from the standalone user interface. Once the acquisition user interface is invoked, the user may create an image in signature window 1604 by using pointing device 1305, and enter alternate text in the acquisition user interface by using a keyboard at client computer 1300 (step 1810). One skilled in the art will appreciate that other methods may exist to enter alternate text in the acquisition user interface, such as a pointing device, or a touch screen. Once the data is entered in the acquisition user interface, the user may select the done button to signify the completion of the image and alternate text, and once pressed, the image and alternate text are saved as a new transparent GIF image, and a new HTML file is created, both as described above (step 1812).

At this point, the user returns to the standalone user interface 1600 to select an image and image attributes to use in an e-mail message (step 1814). The selection of an image and image attributes are described above with reference to management tool 328. After selection, the user presses "OK," and the HTML file is added to the e-mail message including the image location and the alternate text. Further, a status line is added to the Netscape Communicator Window (step 1816). The status line may indicate that the e-mail message was modified with the standalone user interface, the alternate text, or a link to a web page at the e-mail customization system.

Error Recovery

Although the e-mail customization system is designed to ensure maximum reliability and maximum efficiency, occasionally a process or a server may fail. Therefore, as a precaution, the various servers are monitored. For example, to discover a problem with form server 226 (e.g. ceased image processing), the e-mail customization system periodically sends a special signature form with one barcode to the form server. If the form server is functioning, the special form will be logged in the database as received. However, if the special form is not logged, then a technical personnel is notified of the situation.

Figure 19:
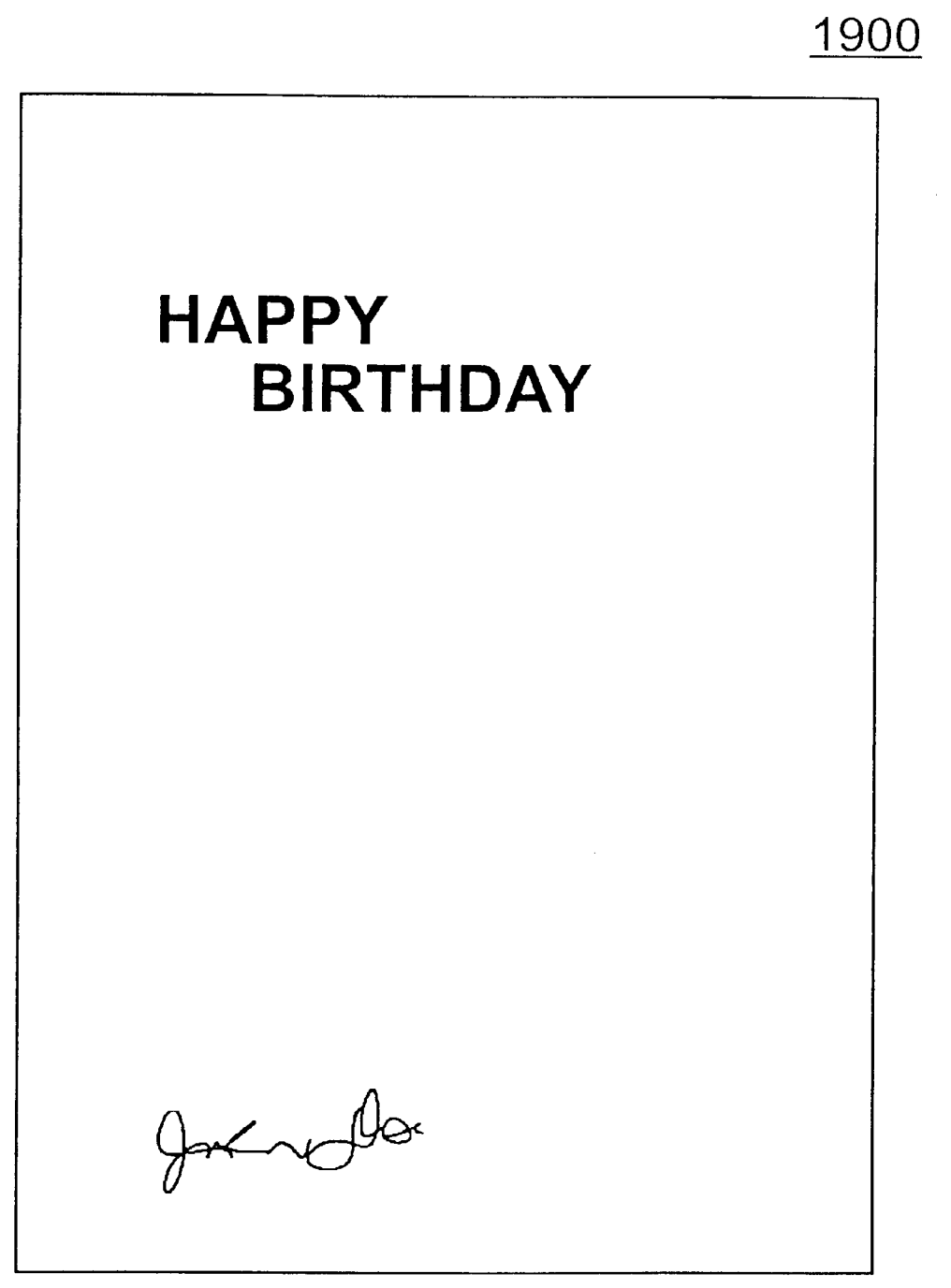

Sigmatic server 228 may halt processing with a sustained period of inactivity. As such, the e-mail customization system periodically sends a "keep-alive" query to sigmatic server 228. A keep-alive query is a query sent to alert sigmatic server 228 to remain awake. Thus, if the e-mail customization site periodically sends a keep-alive to sigmatic server 228, sigmatic server 228 will not halt processing. One skilled in the art will appreciate that other servers and processes at the e-mail customization system 220 maybe monitored in a similar manner Transporting Handwritten Images In addition to inserting images into an e-mail system located on the client computer, the customized software may insert images into a web-based e-mail system or an electronic greeting card. Web-based e-mail systems provide centralized access to an e-mail account from any computer connected to the Internet. This provides the ability to include an image from a computer that does not have the customized software installed. An example of a web-based e-mail system is the well-known Hotmail e-mail system, available to download from "http:/www.hotmail.com." An electronic greeting card is a greeting card viewable on a computer. FIG. 19 depicts an electronic greeting card 1900 with a signature in accordance with methods and systems consistent with the present invention. An electronic greeting card may be stored as an image file that is a composite of two image files: one image file for the text of the card and one image file for the graphics of the card. The image file representing the greeting card may be part of a self executing program or an HTML file located on a web server. An example of an electronic greeting card is available from Blue Mountain Arts at "http:/www.bluemountainarts.com." To insert an image into a web-based e-mail system or an electronic greeting card, the customized software utilizes a management tool. One skilled in the art will appreciate that images may be inserted into other electronic documents, such as a digital signature document, an electronic presentation, or a chat program that facilitates a chat room.

Figure 20:
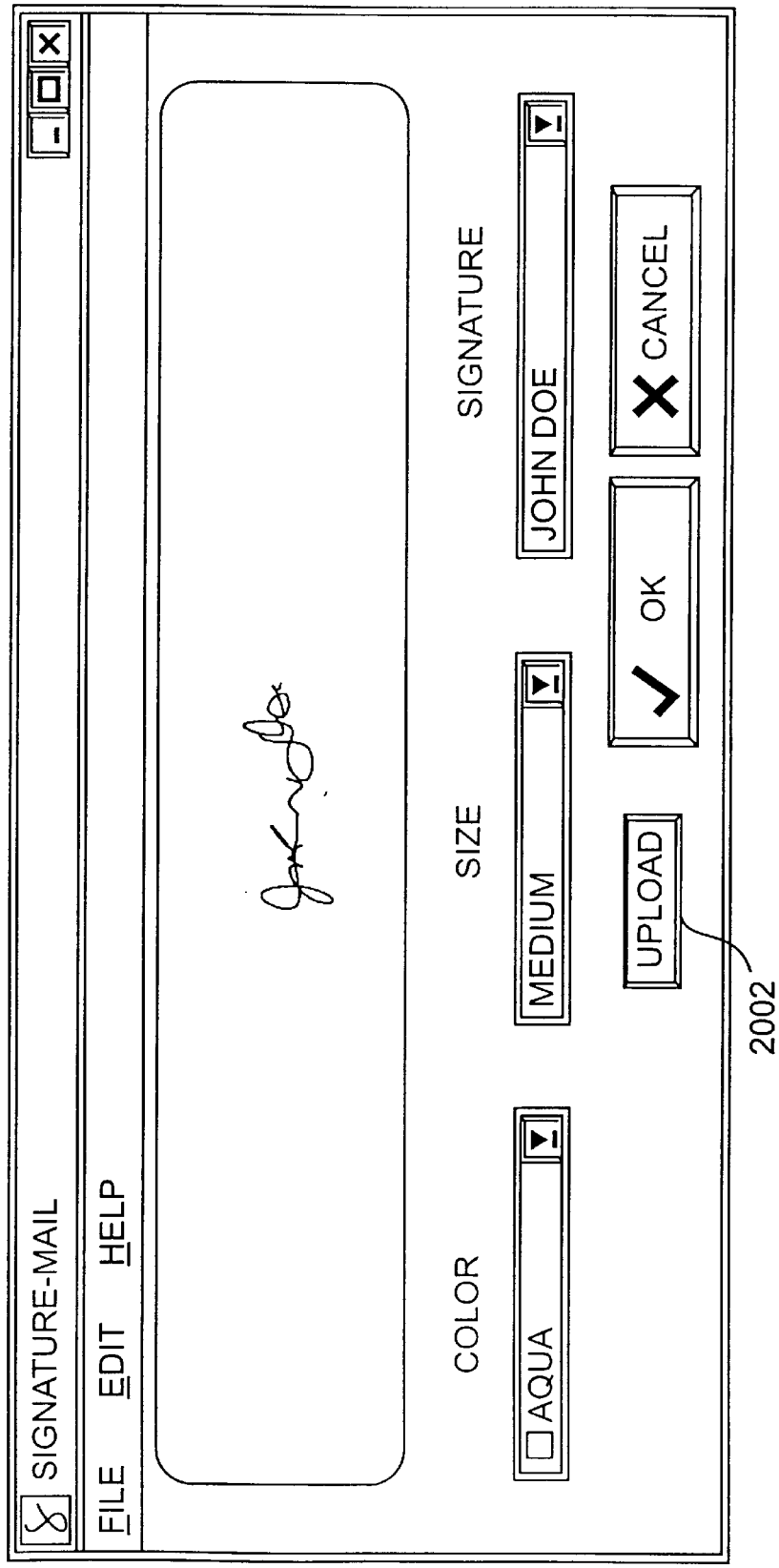
FIG. 20 depicts a diagram of an alternative embodiment of the management tool.

FIG. 20 shows a diagram of an alternative embodiment of the management tool 2000 suitable for inserting images into web-based e-mail systems or electronic greeting cards. That is, management tool 2000 is a modified version of management tool 328 that has the additional capability to upload an image to a web server. The web server is similarly configured to web server 222. The user may initiate the upload process by selecting upload feature 2002 from the management tool. One skilled in the art will appreciate that the image may be uploaded to additional servers, such as an FTP server or a database server.

Figure 21:
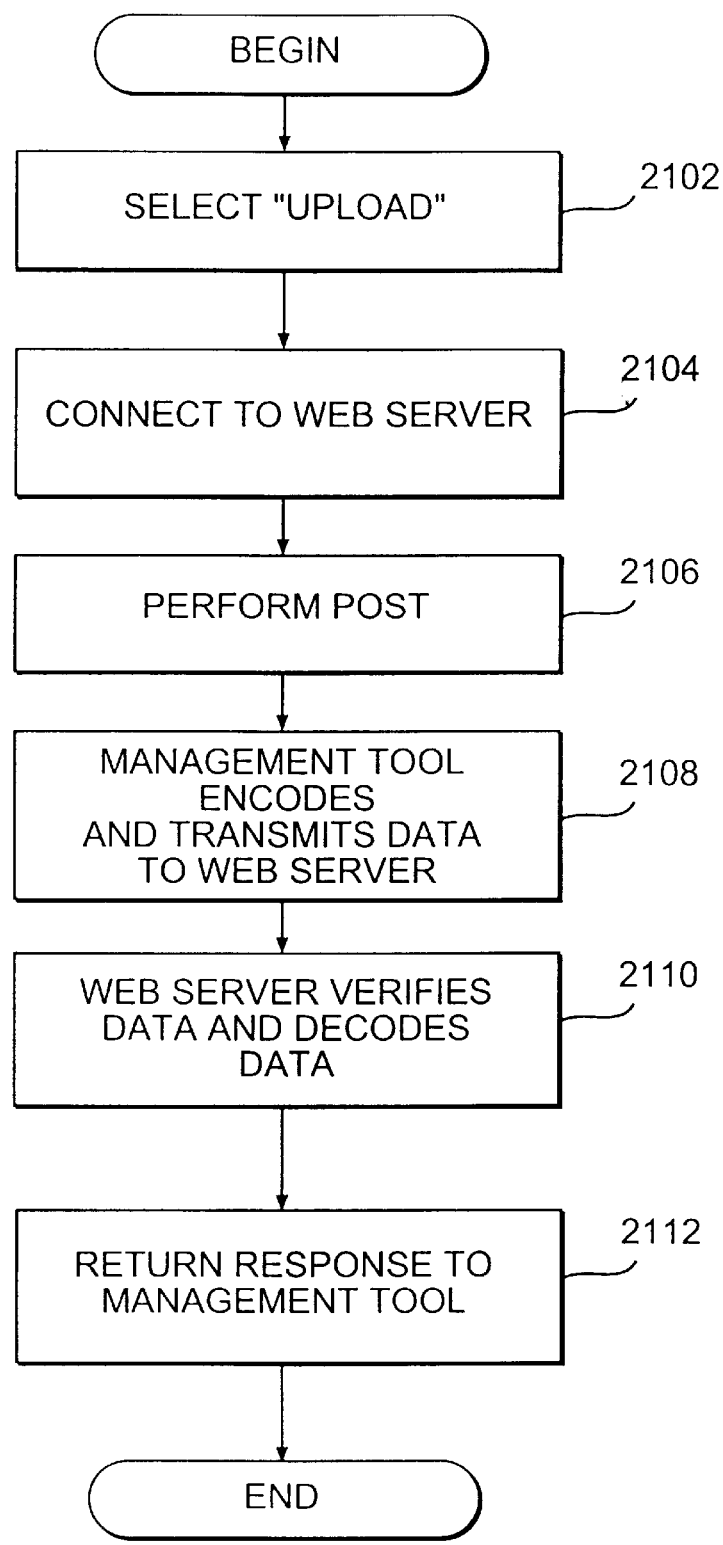
FIG. 21 depicts a flow chart of the steps performed by the user when transporting handwritten images.

FIG. 21 depicts a flow chart of the upload process when initiated, for example, by selecting upload feature 2002 (step 2102). This selection causes management tool 2000 to initiate a connection to the web server on port 80 (step 2104). Management tool 2000 connects to the web server using well-known HTTP protocol standards. Once connected, management tool 2000 encodes the image (i.e., the handwritten signature previously selected by the user) in a Base64 encoding scheme (step 2106). The Base64 encoding scheme is a well-known file format that uses ASCII characters to transmit binary files. More information on the Base64 encoding may be found in RFC 1521, which is incorporated herein by reference. Once encoded, the management tool performs a POST operation to a CGI script located on the web server using the well-known HTTP POST command (step 2108). The CGI script may be located by manually entering in the URL into the management tool or extracted from a configuration file received from the web server in the "application/sigmail" file format. To receive the configuration file from the web server, the user selects a link from within the web browser displaying the greeting card web page that downloads the configuration file. Once downloaded, management tool 2000 is initiated since management tool 2000 is the registered helper application for the "application/sigmail" file format. Additionally, the username and password may be extracted from the "application/sigmail" configuration file removing the need for a user to enter any additional information. Once the CGI script is manually located or extracted from the "application/sigmail" file format, the user may perform the POST operation. The HTTP POST command is the defacto HTTP command to submit information to a web server. More information on the HTTP POST command may be found in RFC 1945 and 2068, which are incorporated herein by reference. RFC 1945, 2068 and 1521 are available for download from "http:/info.internet.isi.edu:80/in-notes/rfc/files/". The POST command includes the version number, username, password, alternate text, signature file type and image within the POST command. For example, the POST command may contain:

Version=1.0&Username="JohnDoe"&Password="mypassword"&AlternateText="John Doe"&SigType="GIF"&SigData="09010101001910019910019910011"

The username, password and web server URL

Once the CGI script receives the information from the POST command, the CGI script parses the information and decodes the image (step 2110). The CGI script decodes the image into a binary file format, such as GIF, from the Base64 format and stores the decoded image and the alternate text in a storage area located on the web server. The CGI script uses well known parsing techniques to parse the information from the POST command. Once parsed, the CGI script can verify the username or password to determine whether the user has an account located on the web server. For example, a guest account may not require a password. Next, the CGI script creates an HTML file that references the location of the image (e.g., the handwritten signature) and alternate text as described above (step 2112). Similar to the installation of the customized software described above, the HTML file is used to insert the image and alternate text into the web-based e-mail message or the electronic greeting cards. The image is inserted into the electronic greeting card by overlaying the image onto the image representing the greeting card to create an overlay image file. One skilled in the art will appreciate that the image and alternate text may be directly included in an e-mail message or electronic greeting card without an HTML file. Once the image and alternate text data are referenced, the web server transmits a response using the HTTP protocol to management tool 2000 indicating the data has been received and the image representing the handwritten signature has now been incorporated into the greeting card (step 2114).

Conclusion

Methods and systems consistent with the present invention provide the ability to incorporate images and handwritten signatures into existing e-mail messages. Specifically, a custom software package integrates with existing e-mail packages providing the ability to select different handwritten signatures or images and provide the ability to manipulate various attributes of the images. Once a desired image is selected, the image is included in e-mail sent from the user. A recipient capable of displaying HTML e-mail messages, views the e-mail message with the signature. This image provides a readily discernable visual queue indicating the sender of the e-mail message. Methods and systems consistent with the present invention can work well with e-mail customization systems written in C++, Perl, C or other programming languages such as Java.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone.

What is claimed is:

1. A method of providing through a network communications that include handwriting integrated within the communications, said method comprising:

installing, at a processor, code that processes images for communications sent through the network from at least one additional processor, wherein installing the code that processes the images for communications comprises installing a plug-in for an application installed at the processor;

receiving a communication from the at least one additional processor through the network, wherein the communication includes text and an image of information that was handwritten by a user;

determining a format for displaying the communication; and displaying the communication based on the format and the installed code such that the handwritten information appears integrated with the text of the communication.

2. A method of providing through a network communications that include handwriting integrated within the communications, said method comprising:

installing, at a processor, code that processes images for communications sent through the network from at least one additional processor;

receiving a communication from the at least one additional processor through the network, wherein the communication includes text and an image of information that was handwritten by a user; and determining a format for displaying the communication;

determining a background for the image that will appear transparent within the communication such that the information that was handwritten appears integrated within the communication; and displaying the communication based on the format and the installed code.

3. A method of providing through a network communications that include handwriting integrated within the communications, said method comprising:

installing, at a processor, code that processes images for communications sent through the network from at least one additional processor;

receiving a communication from the at least one additional processor through the network, wherein the communication includes text and an image of information that was handwritten by a user;

determining a format for displaying the communication;

determining whether the format supports displaying the image within the communication; and displaying the communication based on the format and the installed code such that the handwritten information appears integrated with the text of the communication when the format supports displaying the image, and displaying text that corresponds to the handwritten information of the image when the format fails to support displaying the image.

4. A system for providing through a network communications that include handwriting integrated within the communications, said system comprising:

means for installing, at a processor, code that processes images for communications sent through the network from at least one additional processor, wherein the means for installing installs a plug-in for an application installed at the processor;

means for receiving a communication from the at least one additional processor through the network, wherein the communication includes text and an image of information that was handwritten by a user;

means for determining a format for displaying the communication: and means for displaying the communication based on the format and the installed code such that the handwritten information appears integrated with the text of the communication.

5. A system for providing through a network communications that include handwriting integrated within the communications, said system comprising:

means for installing, at a processor, code that processes images for communications sent through the network from at least one additional processor;

means for receiving a communication from the at least one additional processor through the network, wherein the communication includes text and an image of information that was handwritten by a user; and means for determining a format for displaying the communication; means for determining a background for the image that will appear transparent within the communication such that the information that was handwritten appears integrated within the communication; and means for displaying the communication based on the format and the installed code.

6. A system for providing through a network communications that include handwriting integrated within the communications, said system comprising:

means for installing, at a processor. code that processes images for communications sent through the network from at least one additional processor;

means for receiving a communication from the at least one additional processor through the network, wherein the communication includes text and an image of information that was handwritten by a user;

means for determining a format for displaying the communication;

means for determining whether the format supports displaying the image within the communication; and means for displaying the communication based on the format and the installed code such that the handwritten information appears integrated with the text of the communication when the format supports displaying the image, and displaying text that corresponds to the handwritten information of the image when the format fails to support displaying the image.

* * * * *